United States Patent
Chae et al.

(10) Patent No.: US 11,617,099 B2
(45) Date of Patent: Mar. 28, 2023

(54) METHOD BY WHICH TERMINAL REPORTS LOGGED INFORMATION ABOUT QUALITY OF SIDELINK IN WIRELESS COMMUNICATION SYSTEM SUPPORTING SIDELINK, AND DEVICE THEREFOR

(71) Applicant: LG ELECTRONICS INC., Seoul (KR)

(72) Inventors: Hyukjin Chae, Seoul (KR); Sunghoon Jung, Seoul (KR)

(73) Assignee: LG Electronics Inc., Seoul (KR)

(*) Notice: Subject to any disclaimer, the term of this patent is extended or adjusted under 35 U.S.C. 154(b) by 78 days.

(21) Appl. No.: 17/255,650

(22) PCT Filed: Jul. 2, 2019

(86) PCT No.: PCT/KR2019/008057
§ 371 (c)(1),
(2) Date: Dec. 23, 2020

(87) PCT Pub. No.: WO2020/009431
PCT Pub. Date: Jan. 9, 2020

(65) Prior Publication Data
US 2021/0289380 A1    Sep. 16, 2021

(30) Foreign Application Priority Data

Jul. 2, 2018   (KR) .................. 10-2018-0076642
Jul. 3, 2018   (KR) .................. 10-2018-0076793

(51) Int. Cl.
*H04W 24/10* (2009.01)
*H04W 72/12* (2009.01)
(Continued)

(52) U.S. Cl.
CPC ....... *H04W 24/10* (2013.01); *H04W 72/1226* (2013.01); *H04W 4/40* (2018.02); *H04W 88/06* (2013.01)

(58) Field of Classification Search
CPC ..... H04W 8/24; H04W 52/383; H04W 24/10; H04W 24/00; H04W 56/0015
(Continued)

(56) References Cited

U.S. PATENT DOCUMENTS 8,527,199 B1 * 9/2013 Burnette ................ G01C 21/32
                                                           701/425
8,897,150 B2 * 11/2014 Jung .................... H04W 76/27
                                                           370/252
(Continued)

FOREIGN PATENT DOCUMENTS

WO    2011099725 A2    8/2011
WO    WO-2012021004 A2 *  2/2012    ............ H04W 24/00
(Continued)

OTHER PUBLICATIONS

Intel Corporation, "Sidelink Resource Pool Sharing for eNB-Controlled and UE-Autonomous V2V Transmission Modes", 3GPP TSG RAN WG1 Meeting #92bis R1-1804690, Sanya, China, Apr. 16-20, 2018 (Year: 2018).*
(Continued)

*Primary Examiner* — William D Cumming
(74) *Attorney, Agent, or Firm* — Dentons US LLP

(57) ABSTRACT

Methods for reporting logged information by a user equipment (UE) and a UE reporting logged information for sidelink communications. The measurement information includes a reference signal received power (RSRP) and a reference signal received quality (RSRQ) independently measured and logged for each Proximity Service Per-Packet Priority (PPPP). Reporting the logged information is based
(Continued)

on a transmission delay higher than a threshold configured for the each PPPP.

11 Claims, 25 Drawing Sheets

(51) Int. Cl.
 *H04W 4/40* (2018.01)
 *H04W 88/06* (2009.01)
(58) Field of Classification Search
 USPC .......................................... 370/252; 455/423
 See application file for complete search history.

(56) References Cited

U.S. PATENT DOCUMENTS

| | | | | |
|---|---|---|---|---|
| 11,252,675 | B2* | 2/2022 | Hong | H04W 52/383 |
| 2011/0194441 | A1* | 8/2011 | Jung | H04W 76/27 |
| | | | | 370/252 |
| 2013/0188502 | A1* | 7/2013 | Yang | H04W 72/0413 |
| | | | | 370/252 |
| 2014/0128057 | A1* | 5/2014 | Siomina | H04W 56/00 |
| | | | | 455/423 |
| 2015/0314780 | A1* | 11/2015 | Stenneth | B60W 30/182 |
| | | | | 701/1 |
| 2016/0358479 | A1* | 12/2016 | Riedelsheimer | G08G 1/0145 |
| 2019/0200250 | A1* | 6/2019 | Engström | H04W 72/046 |
| 2020/0037307 | A1* | 1/2020 | Kang | H04W 76/14 |
| 2020/0366421 | A1* | 11/2020 | Tang | H04L 1/1816 |
| 2021/0058899 | A1* | 2/2021 | Lee | H04L 1/0003 |
| 2021/0195543 | A1* | 6/2021 | Lee | H04W 56/0015 |
| 2021/0243701 | A1* | 8/2021 | Hong | H04W 52/383 |
| 2021/0250881 | A1* | 8/2021 | Lee | H04W 72/0406 |
| 2021/0258980 | A1* | 8/2021 | Luo | H04W 72/121 |
| 2021/0289380 | A1* | 9/2021 | Chae | H04W 24/10 |
| 2022/0116959 | A1* | 4/2022 | Li | H04W 72/1242 |

FOREIGN PATENT DOCUMENTS

| | | | |
|---|---|---|---|
| WO | 2017078783 A1 | 5/2017 | |
| WO | WO-2020009431 A1 * | 1/2020 | ............ H04W 24/10 |

OTHER PUBLICATIONS

M. M. Butt, A. Pantelidou and I. Z. Kovacs, "ML-Assisted UE Positioning: Performance Analysis and 5G Architecture Enhancements,"in IEEE Open Journal of Vehicular Technology, vol. 2, pp. 377-388, 2021, doi: 10.1109/OJVT.2021.3110134. (Year: 2021).*

J. Puttonen, J. Turkka, O. Alanen and J. Kurjenniemi, "Coverage optimization for Minimization of Drive Tests in LTE with extended RLF reporting," 21st Annual IEEE International Symposium on Personal, Indoorand Mobile Radio Communications, 2010, pp. 1764-1768, doi: 10.1109/PIMRC.2010.5671907. (Year: 2010).*

Ericsson, "Simulation scenarios and performance metrics for V2X", 3GPP TSG-RAN WG1 Meeting #93, May 21-25, 2018, R1-1806151.

Fraunhofer HHI, Fraunhofer IIS, "Resource Pool Sharing between V2X Mode 3 and Mode 4 UEs", 3GPP TSG RAN WG1 Meeting #93, May 21-25, 2018, R1-1807220.

LG Electronics, "Summary of Mode 4 CA", 3GPP TSG RAN WG1 Meeting #93, May 21-25, 2018, R1-1807460.

* cited by examiner (a)

(b)

(a)

(b)

(a)

(b)

METHOD BY WHICH TERMINAL REPORTS LOGGED INFORMATION ABOUT QUALITY OF SIDELINK IN WIRELESS COMMUNICATION SYSTEM SUPPORTING SIDELINK, AND DEVICE THEREFOR

This application is the National Stage filing under 35 U.S.C. 371 of International Application No. PCT/KR2019/008057, filed on Jul. 2, 2019, which claims the benefit of Korean Patent Application Nos. 10-2018-0076642, filed on Jul. 2, 2018 and 10-2018-0076793, filed on Jul. 3, 2018, the contents of which are all hereby incorporated by reference herein in their entirety.

TECHNICAL FIELD

The present disclosure relates to a method of reporting logged information about the quality of sidelink by a user equipment in a wireless communication system supporting sidelink, and an apparatus therefor.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi-carrier frequency division multiple access (MC-FDMA) system.

Device-to-device (D2D) communication is a communication scheme in which a direct link is established between user equipments (UEs) and the UEs exchange voice and data directly without intervention of an evolved Node B (eNB). D2D communication may cover UE-to-UE communication and peer-to-peer communication. In addition, D2D communication may be applied to machine-to-machine (M2M) communication and machine type communication (MTC).

D2D communication is under consideration as a solution to the overhead of an eNB caused by rapidly increasing data traffic. For example, since devices exchange data directly with each other without intervention of an eNB by D2D communication, compared to legacy wireless communication, network overhead may be reduced. Further, it is expected that the introduction of D2D communication will reduce procedures of an eNB, reduce the power consumption of devices participating in D2D communication, increase data transmission rates, increase the accommodation capability of a network, distribute load, and extend cell coverage.

At present, vehicle-to-everything (V2X) communication in conjunction with D2D communication is under consideration. In concept, V2X communication covers vehicle-to-vehicle (V2V) communication, vehicle-to-pedestrian (V2P) communication for communication between a vehicle and a different kind of terminal, and vehicle-to-infrastructure (V2I) communication for communication between a vehicle and a roadside unit (RSU).

DETAILED DESCRIPTION OF THE DISCLOSURE

Technical Problems

An object of the present disclosure is to provide a method of reporting, to an eNB, logging information considering characteristics of sidelink between UEs by informing the eNB of whether smooth performance is performed on sidelink according to an area or a situation through logging and reporting of service quality for sidelink.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solutions

According to an aspect of the present disclosure, provided herein is a method of reporting logged information about quality of sidelink by a user equipment (UE) in a wireless communication system supporting sidelink, including logging quality information measured for a sidelink signal, and reporting the logged quality information to a base station (BS), wherein the quality information is separately logged according to a scheduling mode of a resource for the sidelink signal.

The scheduling mode may include a first scheduling mode in which the BS schedules the resource for the sidelink signal for the UE and a second scheduling mode in which the UE schedules the resource for the sidelink signal in a preset resource pool.

The quality information may be measured with respect to a proximity service (ProSe) per-packet priority (PPPP) or a ProSe per-packet reliability (PPPR).

The quality information may be separately measured according to the preset resource pool, a distance from another UE, a traveling direction of the UE, or a geographical position of the UE.

The UE may report the logged quality information to the BS, based on at least one of a block error ratio (BLER), a packet reception ratio (PRR), reference signal received power (RSRP), reference signal received quality (RSRQ), a received signal strength indicator (RSSI), or a channel busy ratio (CBR), which is less than a preset threshold value.

The quality information may include at least one of the size of a packet related to the sidelink signal, information about a generation interval of the packet, information about an average time staying in a queue before transmission of the packet, or information about a dropped ratio of the packet.

The quality information may include at least one of information about a modulation and coding scheme (MCS) related to the sidelink signal, information about carrier aggregation (CA) capability, or information about a multiple-input multiple-output (MIMO) scheme.

The quality information may include information about how many times resource reselection for the sidelink signal is triggered or how frequently resource reselection for the sidelink signal is triggered.

The quality information may include at least one of information about quality of a reference synchronization signal, information about quality related to positioning, information about a recognition rate of a sensor included in the UE, or information about mobility of the UE.

The quality information may include at least one of a channel utilization ratio (CR) or a channel busy ratio (CBR).

The quality information may include at least one of a block error rate (BLER), a packet reception ratio (PRR), or packet inter-reception time (PIR), measured for the received sidelink signal.

The PIR may be a measurement value for a time difference between received sidelink signals having an equal source identifier (ID).

The quality information may include first quality information obtained by measuring reference signal received power (RSRP), reference signal received quality (RSRQ), or a received signal strength indicator (RSSI) of each packet and second quality information obtained by measuring a channel busy ratio (CBR) or a channel utilization ratio (CR) of each preset resource pool.

The method may further include receiving logging configuration information from the BS, and the UE may report only one of quality information logged for the first scheduling mode and quality information logged for the second scheduling mode, based on the logging configuration information, to the BS.

In another aspect of the present disclosure, provided herein is an apparatus for transmitting a sidelink signal in a wireless communication system supporting sidelink, including a processor, and a memory connected to the processor, wherein the processor logs quality information measured for the sidelink signal and transmits the logged quality information to the memory, and wherein the quality information is separately logged according to a scheduling mode of a resource for the sidelink signal.

The processor may switch a traveling mode of the apparatus from an autonomous traveling mode to a manual traveling mode or from the manual traveling mode to the autonomous traveling mode, based on the quality information.

Advantageous Effects

According to various embodiments of the present disclosure, an eNB may be informed of whether smooth performance is performed on sidelink according to an area or a situation through logging and reporting of service quality for sidelink.

According to the present disclosure, logged information of characteristic quality information of sidelink rather than communication between a cellular network and a UE may be reported to an eNB.

It will be appreciated by persons skilled in the art that the effects that could be achieved with the present disclosure are not limited to what has been particularly described hereinabove and other advantages of the present disclosure will be more clearly understood from the following detailed description.

DESCRIPTION OF DRAWINGS

The accompanying drawings, which are included to provide a further understanding of the present disclosure and are incorporated in and constitute a part of this application, illustrate embodiments of the present disclosure and together with the description serve to explain the principle of the present disclosure. In the drawings.

BEST MODE FOR CARRYING OUT THE DISCLOSURE

Figure 1:
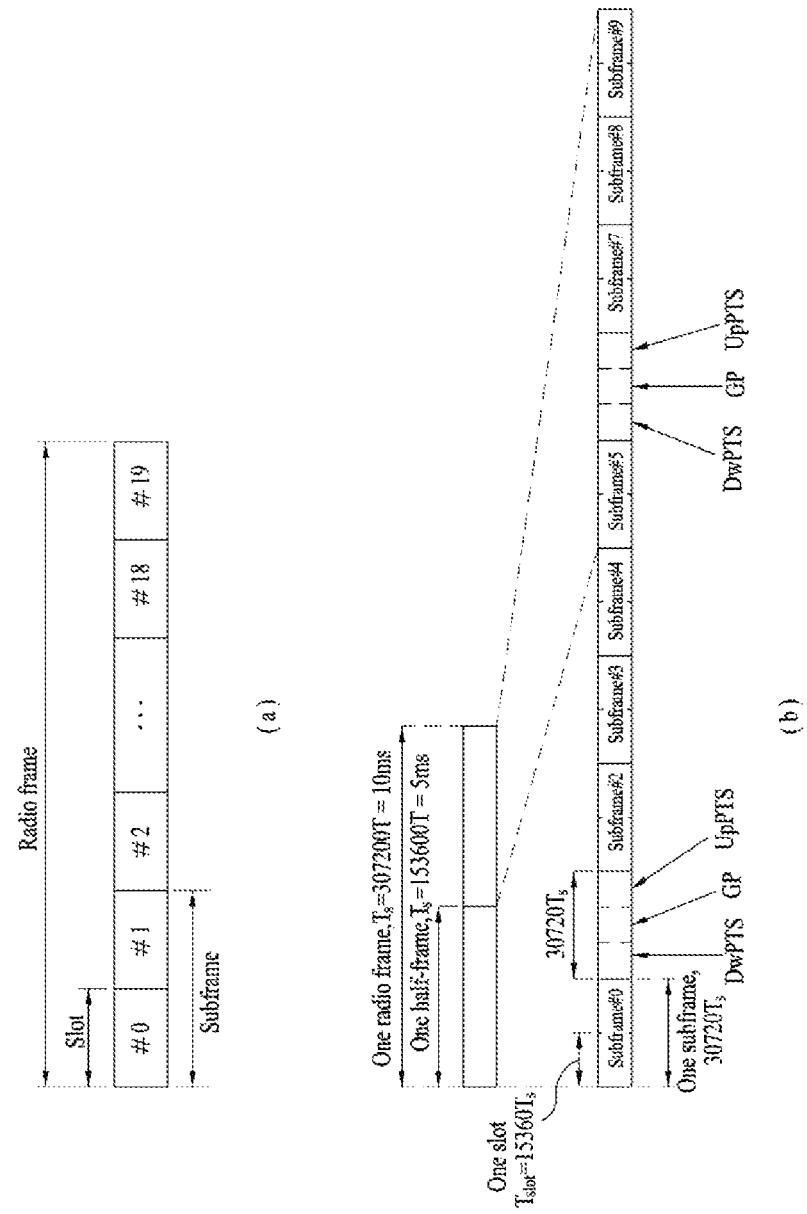
FIG. 1 is a view illustrating the structure of a radio frame.

The embodiments of the present disclosure described hereinbelow are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or features of any one embodiment may be included in another embodiment and may be replaced with corresponding constructions or features of another embodiment.

In the embodiments of the present disclosure, a description is made, centering on a data transmission and reception relationship between a base station (BS) and a user equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'relay node (RN)' or 'relay station (RS)'. The term 'terminal' may be replaced with the term 'UE', 'mobile station (MS)', 'mobile subscriber station (MSS)', 'subscriber station (SS)', etc.

The term "cell", as used herein, may be applied to transmission and reception points such as a base station (eNB), a sector, a remote radio head (RRH), and a relay, and may also be extensively used by a specific transmission/reception point to distinguish between component carriers.

Specific terms used for the embodiments of the present disclosure are provided to help the understanding of the present disclosure. These specific terms may be replaced with other terms within the scope and spirit of the present disclosure.

In some cases, to prevent the concept of the present disclosure from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present disclosure can be supported by standard documents disclosed for at least one of wireless access systems, Institute of Electrical and Electronics Engineers (IEEE) 802, 3rd Generation Partnership Project (3GPP), 3GPP long term evolution (3GPP LTE), LTE-advanced (LTE-A), and 3GPP2. Steps or parts that are not described to clarify the technical features of the present disclosure can be supported by those documents. Further, all terms as set forth herein can be explained by the standard documents.

Techniques described herein can be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), etc. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA) etc. UTRA is a part of universal mobile telecommunications system (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (wireless metropolitan area network (WirelessMAN)-OFDMA Reference System) and the IEEE 802.16m standard (WirelessMAN-OFDMA Advanced System). For clarity, this application focuses on the 3GPP LTE and LTE-A systems. However, the technical features of the present disclosure are not limited thereto.

LTE/LTE-A Resource Structure/Channel

With reference to FIG. 1, the structure of a radio frame will be described below.

In a cellular orthogonal frequency-division multiplexing (OFDM) wireless packet communication system, uplink and/or downlink data packets are transmitted in subframes. One subframe is defined as a predetermined time period including a plurality of OFDM symbols. The 3GPP LTE standard supports a type-1 radio frame structure applicable to frequency division duplex (FDD) and a type-2 radio frame structure applicable to time division duplex (TDD).

FIG. 1(a) illustrates the type-1 radio frame structure. A downlink radio frame is divided into 10 subframes. Each subframe is further divided into two slots in the time domain. A unit time during which one subframe is transmitted is defined as a transmission time interval (TTI). For example, one subframe may be 1 ms in duration and one slot may be 0.5 ms in duration. A slot includes a plurality of OFDM symbols in the time domain and a plurality of resource blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a cyclic prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease inter-symbol interference (ISI).

In the case of the normal CP, one subframe includes 14 OFDM symbols because one slot includes 7 OFDM symbols. The first two or three OFDM symbols of each subframe may be allocated to a physical downlink control channel (PDCCH) and the other OFDM symbols may be allocated to a physical downlink shared channel (PDSCH).

FIG. 1(b) illustrates the type-2 radio frame structure. A type-2 radio frame includes two half frames, each having 5 subframes, a downlink pilot time slot (DwPTS), a guard period (GP), and an uplink pilot time slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
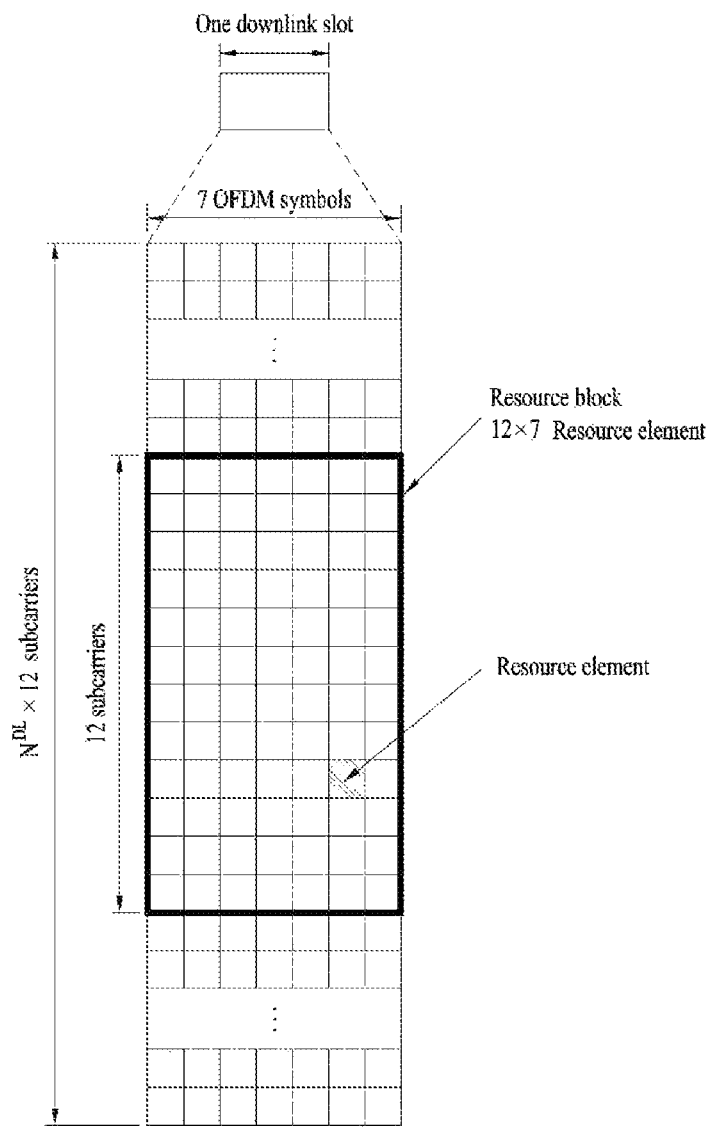
FIG. 2 is a view illustrating a resource grid during the duration of one downlink slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present disclosure. For example, a downlink slot may include 7 OFDM symbols in the case of the normal CP, whereas a downlink slot may include 6 OFDM symbols in the case of the extended CP. Each element of the resource grid is referred to as a resource element (RE). An RB includes 12×7 REs. The number of RBs in a downlink slot, NDL depends on a downlink transmission bandwidth. An uplink slot may have the same structure as a downlink slot.

Figure 3:
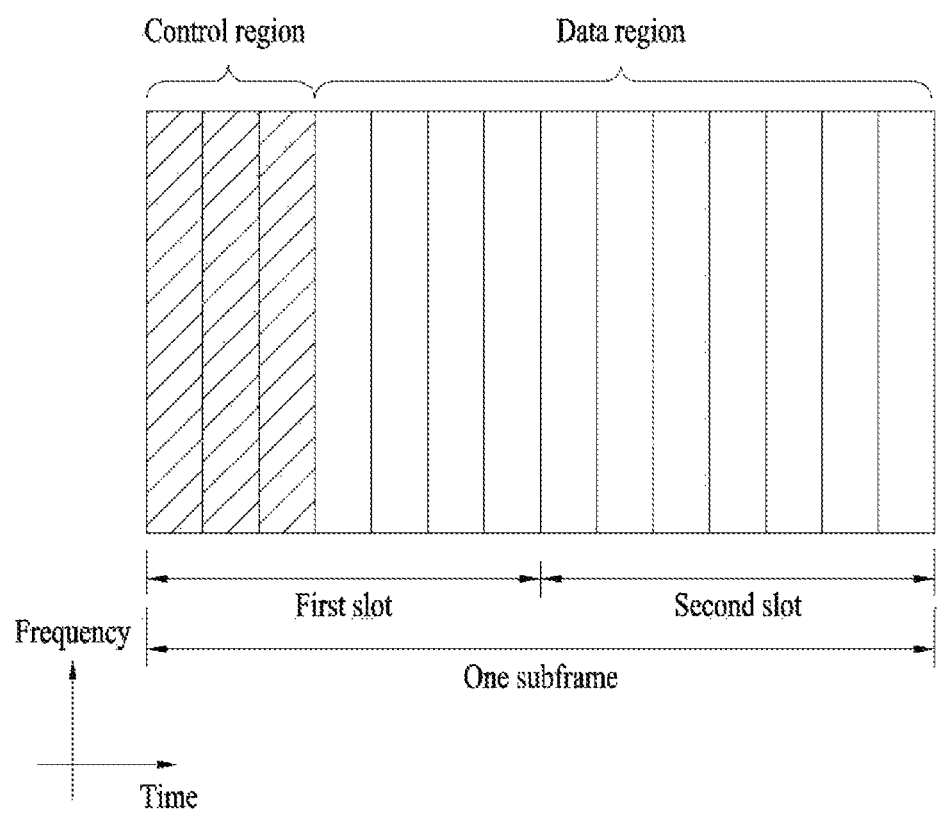
FIG. 3 is a view illustrating the structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include a physical control format indicator channel (PCFICH), a physical downlink control channel (PDCCH), and a physical hybrid automatic repeat request (HARQ) indicator channel (PHICH). The PCFICH is located in the first OFDM symbol of a subframe, carrying information about the number of OFDM symbols used for transmission of control channels in the subframe. The PHICH delivers an HARQ acknowledgment/negative acknowledgment (ACK/NACK) signal in response to an uplink transmission. Control information carried on the PDCCH is called downlink control information (DCI). The DCI transports uplink or downlink scheduling information, or uplink transmission power control commands for UE groups. The PDCCH delivers information about resource allocation and a transport format for a downlink shared channel (DL-SCH), resource allocation information about an uplink shared channel (UL-SCH), paging information of a paging channel (PCH), system information on the DL-SCH, information about resource allocation for a higher-layer control message such as a Random Access Response transmitted on the PDSCH, a set of transmission power control commands for individual UEs of a UE group, transmission power control information, voice over Internet protocol (VoIP) activation information, etc. A plurality of PDCCHs may be transmitted in the control region. A UE may monitor a plurality of PDCCHs. A PDCCH is formed by aggregating one or more consecutive control channel elements (CCEs). A CCE is a logical allocation unit used to provide a PDCCH at a coding rate based on the state of a radio channel A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a cyclic redundancy check (CRC) to control information. The CRC is masked by an identifier (ID) known as a radio network temporary identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a paging indicator Identifier (P-RNTI). If the PDCCH carries system information, particularly, a system information block (SIB), its CRC may be masked by a system information ID and a system information RNTI (SI-RNTI). To indicate that the PDCCH carries a random access response in response to a random access preamble transmitted by a UE, its CRC may be masked by a random access-RNTI (RA-RNTI).

Figure 4:
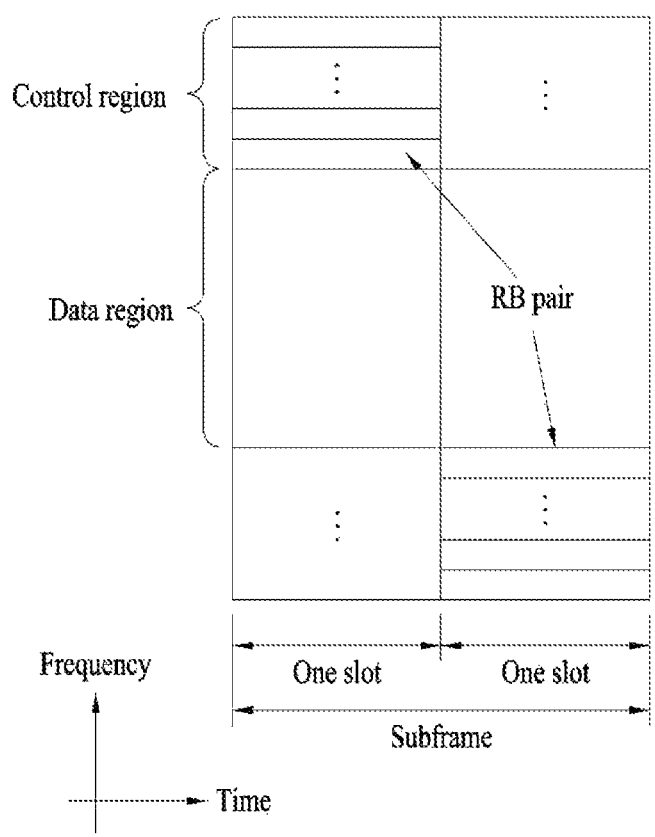
FIG. 4 is a view illustrating the structure of an uplink subframe.

FIG. 4 illustrates the structure of an uplink subframe. An uplink subframe may be divided into a control region and a data region in the frequency domain. A physical uplink control channel (PUCCH) carrying uplink control information is allocated to the control region and a physical uplink shared channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Reference Signal (RS)

In a wireless communication system, a packet is transmitted on a radio channel. In view of the nature of the radio channel, the packet may be distorted during the transmission. To receive the signal successfully, a receiver should compensate for the distortion of the received signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between transmission (Tx) antennas and reception (Rx) antennas is required for successful signal reception. Accordingly, an RS should be transmitted through each Tx antenna.

RSs may be divided into downlink RSs and uplink RSs. In the current LTE system, the uplink RSs include:

i) Demodulation-reference signal (DM-RS) used for channel estimation for coherent demodulation of information delivered on a PUSCH and a PUCCH; and ii) Sounding reference signal (SRS) used for an eNB or a network to measure the quality of an uplink channel in a different frequency.

The downlink RSs are categorized into:

i) Cell-specific reference signal (CRS) shared among all UEs of a cell;

ii) UE-specific RS dedicated to a specific UE;

iii) DM-RS used for coherent demodulation of a PDSCH, when the PDSCH is transmitted;

iv) Channel state information-reference signal (CSI-RS) carrying CSI, when downlink DM-RSs are transmitted;

v) Multimedia broadcast single frequency network (MBSFN) RS used for coherent demodulation of a signal transmitted in MBSFN mode; and vi) Positioning RS used to estimate geographical position information about a UE.

RSs may also be divided into two types according to their purposes: RS for channel information acquisition and RS for data demodulation. Since its purpose lies in that a UE acquires downlink channel information, the former should be transmitted in a broad band and received even by a UE that does not receive downlink data in a specific subframe. This RS is also used in a situation like handover. The latter is an RS that an eNB transmits along with downlink data in specific resources. A UE can demodulate the data by measuring a channel using the RS. This RS should be transmitted in a data transmission area.

Modeling of Multiple-Input Multiple-Output (MIMO) System

Figure 5:
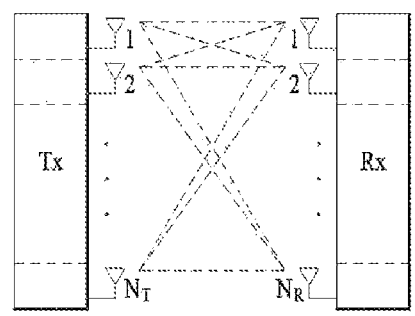
FIG. 5 is a view illustrating the configuration of a wireless communication system having multiple antennas.
Figure 5:
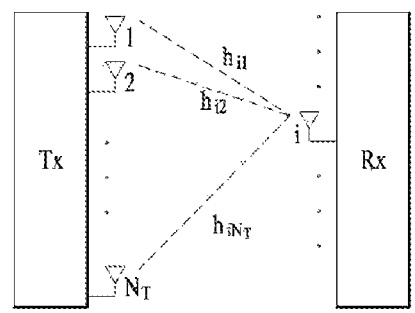

FIG. 5 is a diagram illustrating a configuration of a wireless communication system having multiple antennas.

As shown in FIG. 5(a), if the number of Tx antennas is increased to $N_T$ and the number of Rx antennas is increased to $N_R$, a theoretical channel transmission capacity is increased in proportion to the number of antennas, unlike the case where a plurality of antennas is used in only a transmitter or a receiver. Accordingly, it is possible to improve a transfer rate and to remarkably improve frequency efficiency. As the channel transmission capacity is increased, the transfer rate may be theoretically increased by a product of a maximum transfer rate Ro upon utilization of a single antenna and a rate increase ratio Ri.

$$R_i = \min(N_T, N_R) \quad \text{[Equation 1]}$$

For instance, in an MIMO communication system, which uses four Tx antennas and four Rx antennas, a transmission rate four times higher than that of a single antenna system can be obtained. Since this theoretical capacity increase of the MIMO system has been proved in the middle of 1990s, many ongoing efforts are made to various techniques to substantially improve a data transmission rate. In addition, these techniques are already adopted in part as standards for various wireless communications such as 3G mobile communication, next generation wireless LAN, and the like.

The trends for the MIMO relevant studies are explained as follows. First of all, many ongoing efforts are made in various aspects to develop and research information theory study relevant to MIMO communication capacity calculations and the like in various channel configurations and multiple access environments, radio channel measurement and model derivation study for MIMO systems, spatiotemporal signal processing technique study for transmission reliability enhancement and transmission rate improvement and the like.

In order to explain a communicating method in an MIMO system in detail, mathematical modeling can be represented as follows. It is assumed that there are $N_T$ Tx antennas and $N_R$ Rx antennas.

Regarding a transmitted signal, if there are $N_T$ Tx antennas, the maximum number of pieces of information that can be transmitted is $N_T$. Hence, the transmission information can be represented as shown in Equation 2.

$$s = [s_1, s_2, \ldots, s_{N_T}]^T \quad \text{[Equation 2]}$$

Meanwhile, transmit powers can be set different from each other for individual pieces of transmission information $s_1, s_2, \ldots, s_{N_T}$, respectively. If the transmit powers are set to $P_1, P_2, \ldots, P_{N_T}$, respectively, the transmission information with adjusted transmit powers can be represented as Equation 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

In addition, S can be represented as Equation 4 using diagonal matrix P of the transmission power.

$$\hat{s} = \begin{bmatrix} P_1 & & 0 \\ & P_2 & \\ & & \ddots \\ 0 & & P_{N_T} \end{bmatrix} \begin{bmatrix} s_1 \\ s_2 \\ \vdots \\ s_{N_T} \end{bmatrix} = Ps \quad \text{[Equation 4]}$$

Assuming a case of configuring $N_T$ transmitted signals $x_1, x_2, \ldots, x_{N_T}$, which are actually transmitted, by applying weight matrix W to the information vector $\hat{S}$ having the adjusted transmit powers, the weight matrix W serves to appropriately distribute the transmission information to each antenna according to a transport channel state. $x_1, x_2, \ldots x_{N_T}$ can be expressed by using the vector X as follows.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \ldots & w_{1N_T} \\ w_{21} & w_{22} & \ldots & w_{2N_T} \\ \vdots & & \ddots & \\ w_{i1} & w_{i2} & \ldots & w_{iN_T} \\ \vdots & & \ddots & \\ w_{N_T 1} & w_{N_T 2} & \ldots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{[Equation 5]}$$

In Equation 5, $W_{ij}$ denotes a weight between an $i^{th}$ Tx antenna and $j^{th}$ information. W is also called a precoding matrix.

If the $N_R$ Rx antennas are present, respective received signals $y_1, y_2, \ldots y_{N_R}$ of the antennas can be expressed as follows.

$$y = [y_1, y_2, \ldots, y_{N_R}]^T \quad \text{[equation 6]}$$

If channels are modeled in the MIMO wireless communication system, the channels may be distinguished according to Tx/Rx antenna indexes. A channel from the Tx antenna j to the Rx antenna i is denoted by $h_{ij}$. In $h_{ij}$, it is noted that the indexes of the Rx antennas precede the indexes of the Tx antennas in view of the order of indexes.

FIG. 5(b) is a diagram illustrating channels from the $N_T$ Tx antennas to the Rx antenna i. The channels may be combined and expressed in the form of a vector and a matrix. In FIG. 5(b), the channels from the $N_T$ Tx antennas to the Rx antenna i can be expressed as follows.

$$h_i^T = [h_{i1}, h_{i2}, \ldots, h_{iN_T}] \quad \text{[Equation 7]}$$

Accordingly, all channels from the $N_T$ Tx antennas to the $N_R$ Rx antennas can be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R 1} & h_{N_R 2} & \ldots & h_{N_R N_T} \end{bmatrix}$$

An AWGN (Additive White Gaussian Noise) is added to the actual channels after a channel matrix H. The AWGN $n_1, n_2, \ldots, n_{N_R}$ respectively added to the $N_R$ Rx antennas can be expressed as follows.

$$n = [n_1, n_2, \ldots, n_{N_R}]^T \quad \text{[Equation 9]}$$

Through the above-described mathematical modeling, the received signals can be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R 1} & h_{N_R 2} & \ldots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = Hx + n \quad \text{[Equation 10]}$$

Meanwhile, the number of rows and columns of the channel matrix H indicating the channel state is determined by the number of Tx and Rx antennas. The number of rows of the channel matrix H is equal to the number $N_R$ of Rx antennas and the number of columns thereof is equal to the number $N_T$ of Tx antennas. That is, the channel matrix H is an $N_R \times N_T$ matrix.

The rank of the matrix is defined by the smaller of the number of rows and the number of columns, which are independent from each other. Accordingly, the rank of the matrix is not greater than the number of rows or columns. The rank rank(H) of the channel matrix H is restricted as follows.

$$\text{rank}(H) \leq \min(N_T, N_R) \quad \text{[Equation 11]}$$

Additionally, the rank of a matrix can also be defined as the number of non-zero Eigen values when the matrix is Eigen-value-decomposed. Similarly, the rank of a matrix can be defined as the number of non-zero singular values when the matrix is singular-value-decomposed. Accordingly, the physical meaning of the rank of a channel matrix can be the maximum number of channels through which different pieces of information can be transmitted.

In the description of the present document, 'rank' for MIMO transmission indicates the number of paths capable of sending signals independently on specific time and frequency resources and 'number of layers' indicates the number of signal streams transmitted through the respective paths. Generally, since a transmitting end transmits the number of layers corresponding to the rank number, one rank has the same meaning of the layer number unless mentioned specially.

Synchronization Acquisition of D2D UE

Now, a description will be given of synchronization acquisition between UEs in D2D communication based on the foregoing description in the context of the legacy LTE/LTE-A system. In an OFDM system, if time/frequency synchronization is not acquired, the resulting inter-cell interference (ICI) may make it impossible to multiplex different UEs in an OFDM signal. If each individual D2D UE acquires synchronization by transmitting and receiving a synchronization signal directly, this is inefficient. In a distributed node system such as a D2D communication system, therefore, a specific node may transmit a representative synchronization signal and the other UEs may acquire synchronization using the representative synchronization signal. In other words, some nodes (which may be an eNB, a UE, and a synchronization reference node (SRN, also referred to as a synchronization source)) may transmit a D2D synchronization signal (D2DSS) and the remaining UEs may transmit and receive signals in synchronization with the D2DSS.

Figure 6:
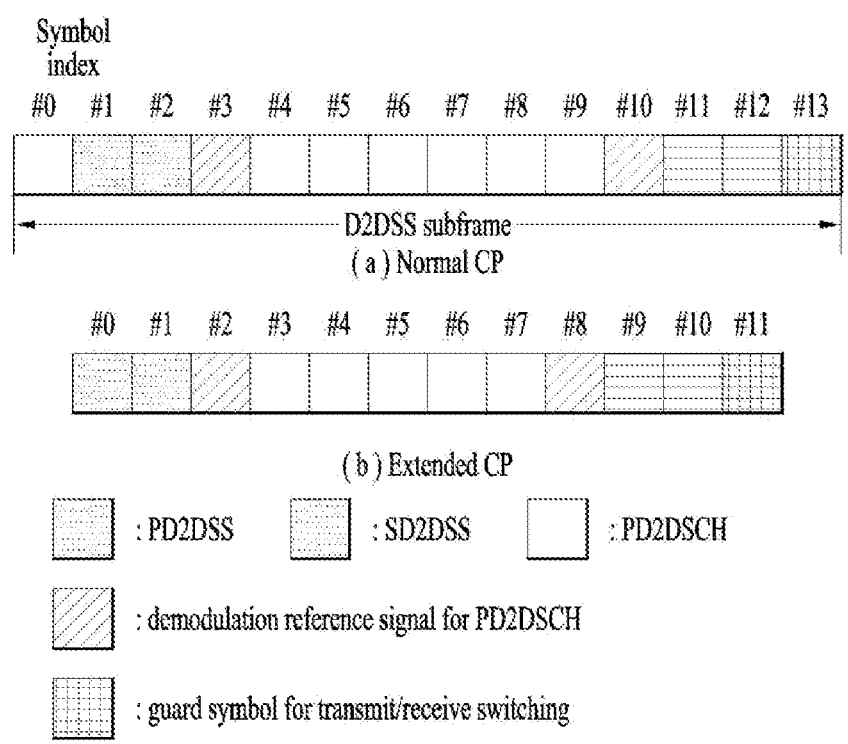
FIG. 6 is a view illustrating a subframe carrying a device-to-device (D2D) synchronization signal.

D2DSSs may include a primary D2DSS (PD2DSS) or a primary sidelink synchronization signal (PSSS) and a secondary D2DSS (SD2DSS) or a secondary sidelink synchronization signal (SSSS). The PD2DSS may be configured to have a similar/modified/repeated structure of a Zadoff-chu sequence of a predetermined length or a primary synchronization signal (PSS). Unlike a downlink (DL) primary synchronization signal (PSS), the PD2DSS may use a different Zadoff-Chu root index (e.g., 26, 37). And, the SD2DSS may be configured to have a similar/modified/repeated structure of an M-sequence or a secondary synchronization signal (SSS). If UEs synchronize their timing with an eNB, the eNB serves as an SRN and the D2DSS is a PSS/SSS. Unlike the DL PSS/SSS (secondary synchronization signal), the PD2SS/SD2DSS follows an uplink (UL) subcarrier mapping scheme. FIG. 6 shows a subframe in which a D2D synchronization signal is transmitted. A physical D2D synchronization channel (PD2DSCH) may be a (broadcast) channel carrying basic (system) information that a UE should first obtain before D2D signal transmission and reception (e.g., D2DSS-related information, a duplex mode (DM), a TDD UL/DL configuration, a resource pool-related information, the type of an application related to the D2DSS, etc.). The PD2DSCH may be transmitted in the same subframe as the D2DSS or in a subframe subsequent to the frame carrying the D2DSS. A DMRS can be used to demodulate the PD2DSCH.

The SRN may be a node that transmits a D2DSS and a PD2DSCH. The D2DSS may be a specific sequence and the PD2DSCH may be a sequence representing specific information or a codeword produced by predetermined channel coding. The SRN may be an eNB or a specific D2D UE. In the case of partial network coverage or out of network coverage, the SRN may be a UE.

Figure 7:
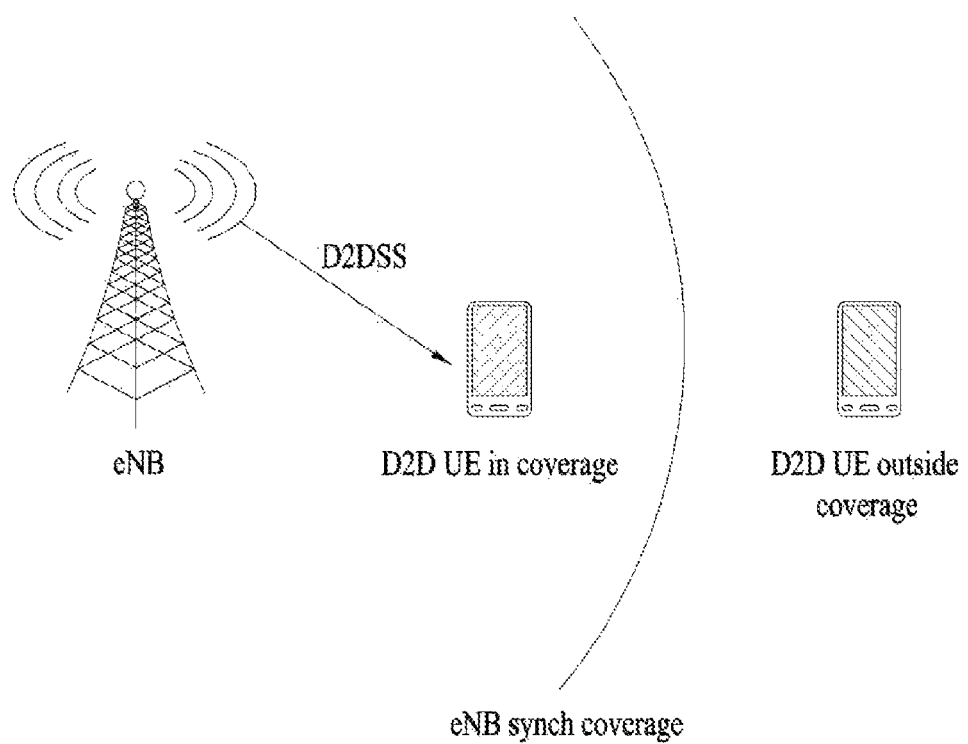
FIG. 7 is a view illustrating relay of a D2D signal.

In a situation illustrated in FIG. 7, a D2DSS may be relayed for D2D communication with an out-of-coverage UE. The D2DSS may be relayed over multiple hops. The following description is given with the appreciation that relay of an SS covers transmission of a D2DSS in a separate format according to a SS reception time as well as direct amplify-and-forward (AF)-relay of an SS transmitted by an eNB. As the D2DSS is relayed, an in-coverage UE may communicate directly with an out-of-coverage UE.

D2D Resource Pool

Figure 8:
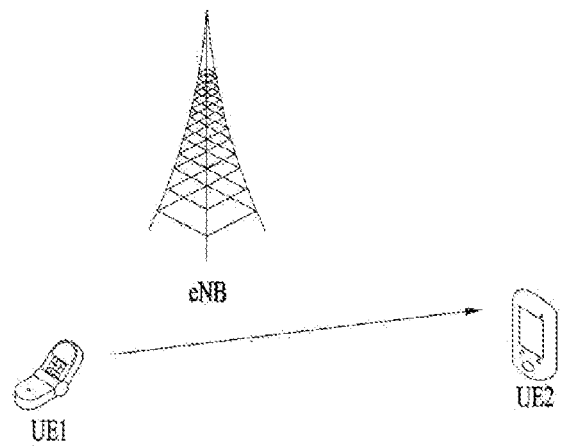
FIG. 8 is a view illustrating an exemplary D2D resource pool for D2D communication.
Figure 8:
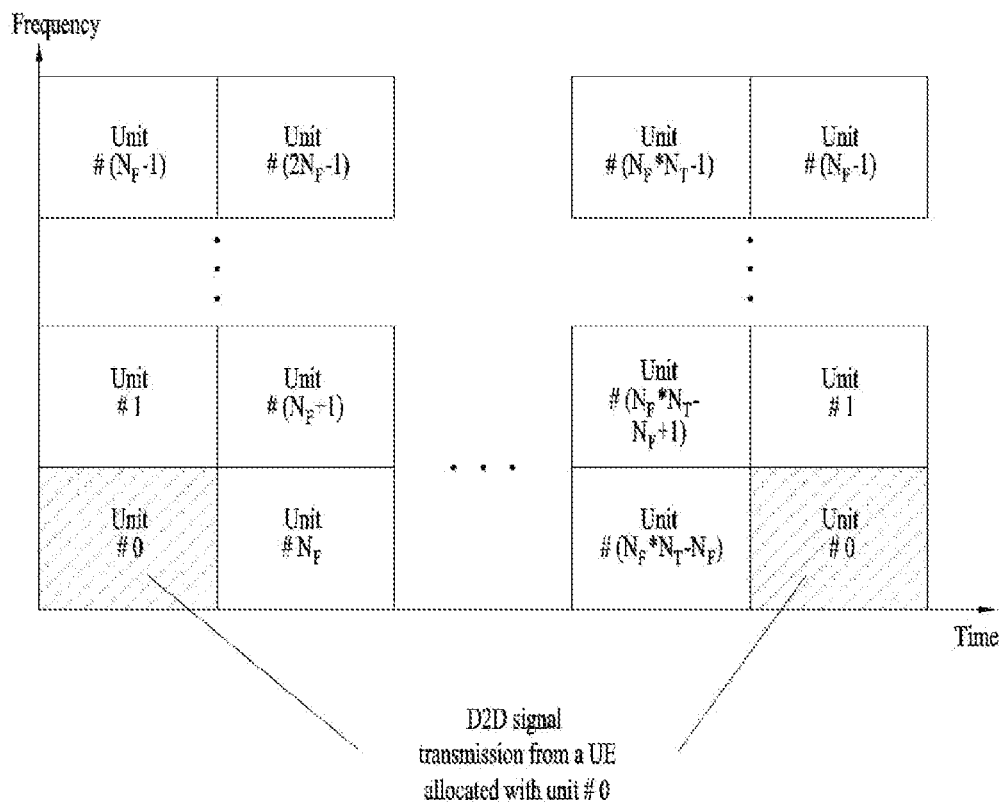

FIG. 8 shows an example of a first UE (UE1), a second UE (UE2) and a resource pool used by UE1 and UE2 performing D2D communication. In FIG. 8(a), a UE corresponds to a terminal or such a network device as an eNB transmitting and receiving a signal according to a D2D communication scheme. A UE selects a resource unit corresponding to a specific resource from a resource pool corresponding to a set of resources and the UE transmits a D2D signal using the selected resource unit. UE2 corresponding to a receiving UE receives a configuration of a resource pool in which UE1 is able to transmit a signal and detects a signal of UE1 in the resource pool. In this case, if UE1 is located at the inside of coverage of an eNB, the eNB can inform UE1 of the resource pool. If UE1 is located at the outside of coverage of the eNB, the resource pool can be informed by a different UE or can be determined by a predetermined resource. In general, a resource pool includes a plurality of resource units. A UE selects one or more resource units from among a plurality of the resource units and may be able to use the selected resource unit(s) for D2D signal transmission. FIG. 8(b) shows an example of configuring a resource unit. Referring to FIG. 8(b), the entire frequency resources are divided into the $N_F$ number of resource units and the entire time resources are divided into the $N_T$ number of resource units. In particular, it is able to define $N_F * N_T$ number of resource units in total. In particular, a resource pool can be repeated with a period of $N_T$ subframes. Specifically, as shown in FIG. 8, one resource unit may periodically and repeatedly appear. Or, an index of a physical resource unit to which a logical resource unit is mapped may change with a predetermined pattern according to time to obtain a diversity gain in time domain and/or frequency domain. In this resource unit structure, a resource pool may correspond to a set of resource units capable of being used by a UE intending to transmit a D2D signal.

A resource pool can be classified into various types. First of all, the resource pool can be classified according to contents of a D2D signal transmitted via each resource pool.

For example, the contents of the D2D signal can be classified into various signals and a separate resource pool can be configured according to each of the contents. The contents of the D2D signal may include a scheduling assignment (SA or physical sidelink control channel (PSCCH)), a D2D data channel, and a discovery channel. The SA may correspond to a signal including information on a resource position of a D2D data channel, information on a modulation and coding scheme (MCS) necessary for modulating and demodulating a data channel, information on a MIMO transmission scheme, information on a timing advance (TA), and the like. The SA signal can be transmitted on an identical resource unit in a manner of being multiplexed with D2D data. In this case, an SA resource pool may correspond to a pool of resources that an SA and D2D data are transmitted in a manner of being multiplexed. The SA signal can also be referred to as a D2D control channel or a physical sidelink control channel (PSCCH). The D2D data channel (or, physical sidelink shared channel (PSSCH)) corresponds to a resource pool used by a transmitting UE to transmit user data. If an SA and a D2D data are transmitted in a manner of being multiplexed in an identical resource unit, D2D data channel except SA information can be transmitted only in a resource pool for the D2D data channel. In other word, REs, which are used to transmit SA information in a specific resource unit of an SA resource pool, can also be used for transmitting D2D data in a D2D data channel resource pool. The discovery channel may correspond to a resource pool for a message that enables a neighboring UE to discover transmitting UE transmitting information such as ID of the UE, and the like.

Despite the same contents, D2D signals may use different resource pools according to the transmission and reception properties of the D2D signals. For example, despite the same D2D data channels or the same discovery messages, they may be distinguished by different resource pools according to transmission timing determination schemes for the D2D signals (e.g., whether a D2D signal is transmitted at the reception time of a synchronization reference signal or at a time resulting from applying a predetermined TA to the reception time of the synchronization reference signal), resource allocation schemes for the D2D signals (e.g., whether an eNB configures the transmission resources of an individual signal for an individual transmitting UE or the individual transmitting UE autonomously selects the transmission resources of an individual signal in a pool), the signal formats of the D2D signals (e.g., the number of symbols occupied by each D2D signal in one subframe or the number of subframes used for transmission of a D2D signal), signal strengths from the eNB, the transmission power of a D2D UE, and so on. In D2D communication, a mode in which an eNB directly indicates transmission resources to a D2D transmitting UE is referred to as sidelink transmission mode 1, and a mode in which a transmission resource area is preconfigured or the eNB configures a transmission resource area and the UE directly selects transmission resources is referred to as sidelink transmission mode 2. In D2D discovery, a mode in which an eNB directly indicates resources is referred to as Type 2, and a mode in which a UE selects transmission resources directly from a preconfigured resource area or a resource area indicated by the eNB is referred to as Type 1.

Figure 9:
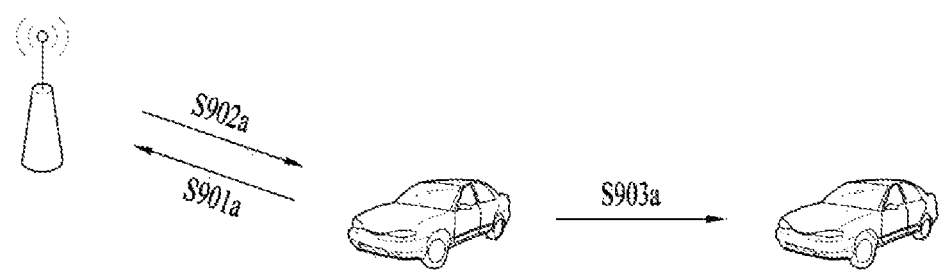
FIG. 9 is a view referred to for describing transmission modes and scheduling schemes for vehicle-to-everything (V2X)
Figure 9:
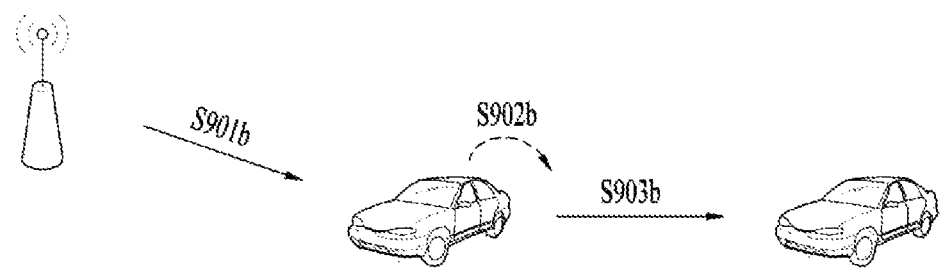
Figure 10:
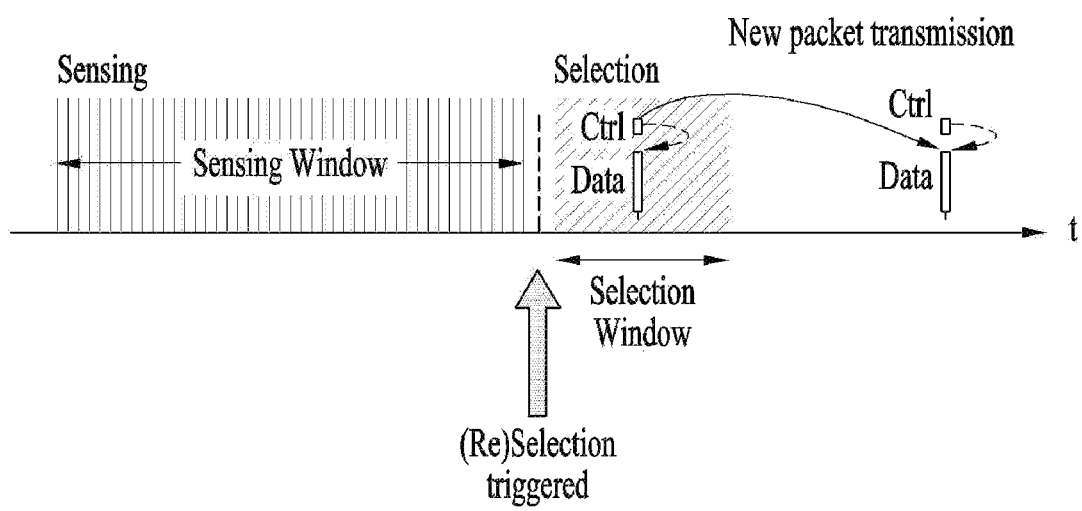
FIG. 10 is a view illustrating a method of selecting resources in V2X.
Figure 11:
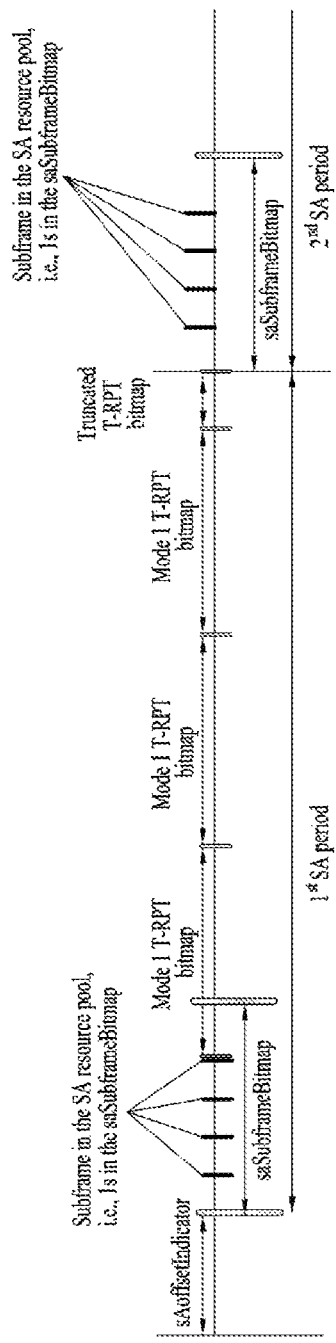
FIG. 11 is a view referred to for describing a scheduling assignment (SA) and data transmission in D2D.

In V2X, sidelink transmission mode 3 based on centralized scheduling and sidelink transmission mode 4 based on distributed scheduling are available. FIG. 9 illustrates scheduling schemes according to these two transmission modes. Referring to FIG. 9, in transmission mode 3 based on centralized scheduling, when a vehicle requests sidelink resources to an eNB (S901a), the eNB allocates the resources (S902a), and the vehicle transmits a signal in the resources to another vehicle (S903a). In the centralized transmission scheme, resources of another carrier may be also scheduled. In distributed scheduling corresponding to transmission mode 4 illustrated in FIG. 9(b), a vehicle selects transmission resources (S902b), while sensing resources preconfigured by the eNB, that is, a resource pool (S901b), and then transmits a signal in the selected resources to another vehicle (S903b). When the transmission resources are selected, transmission resources for a next packet are also reserved, as illustrated in FIG. 10. In V2X, each MAC PDU is transmitted twice. When resources for an initial transmission are reserved, resources for a retransmission are also reserved with a time gap from the resources for the initial transmission. For details of the resource reservation, see Section 14 of 3GPP TS 36.213 V14.6.0, which is incorporated herein as background art.

Transmission and Reception of SA

A UE in sidelink transmission mode 1 may transmit a scheduling assignment (SA) (a D2D signal or sidelink control information (SCI)) in resources configured by an eNB. A UE in sidelink transmission mode 2 may be configured with resources for D2D transmission by the eNB, select time and frequency resources from among the configured resources, and transmit an SA in the selected time and frequency resources.

In sidelink transmission mode 1 or 2, an SA period may be defined as illustrated in FIG. 9. Referring to FIG. 9, a first SA period may start in a subframe spaced from a specific system frame by a specific offset, SAOffsetIndicator indicated by higher-layer signaling. Each SA period may include an SA resource pool and a subframe pool for D2D data transmission. The SA resource pool may include the first subframe of the SA period to the last of subframes indicated as carrying an SA by a subframe bitmap, saSubframeBitmap. The resource pool for D2D data transmission may include subframes determined by a time-resource pattern for transmission (T-RPT) (or a time-resource pattern (TRP)) in mode 1. As illustrated, when the number of subframes included in the SA period except for the SA resource pool is larger than the number of T-RPT bits, the T-RPT may be applied repeatedly, and the last applied T-RPT may be truncated to include as many bits as the number of the remaining subframes. A transmitting UE performs transmission at T-RPT positions corresponding to is in a T-RPT bitmap, and one MAC PDU is transmitted four times.

Figure 12:
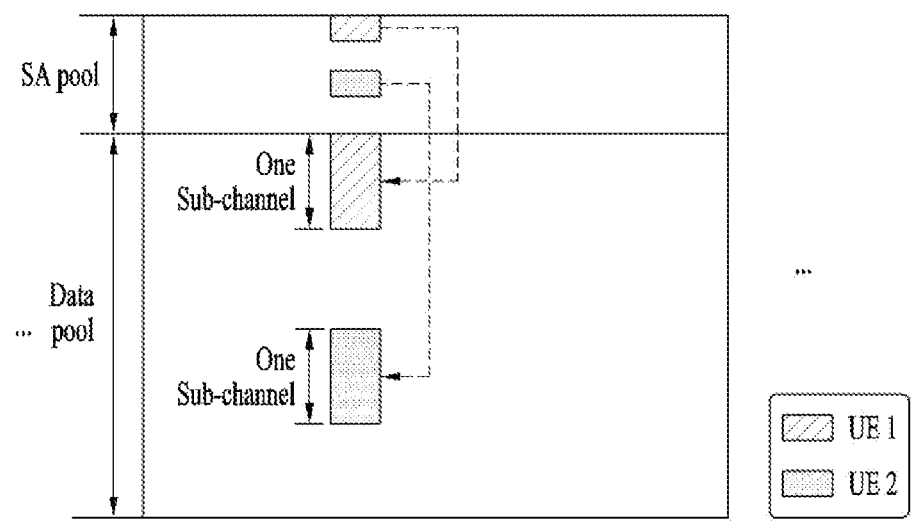
FIG. 12 is a view referred to for describing an SA and data transmission in V2X.
Figure 12:
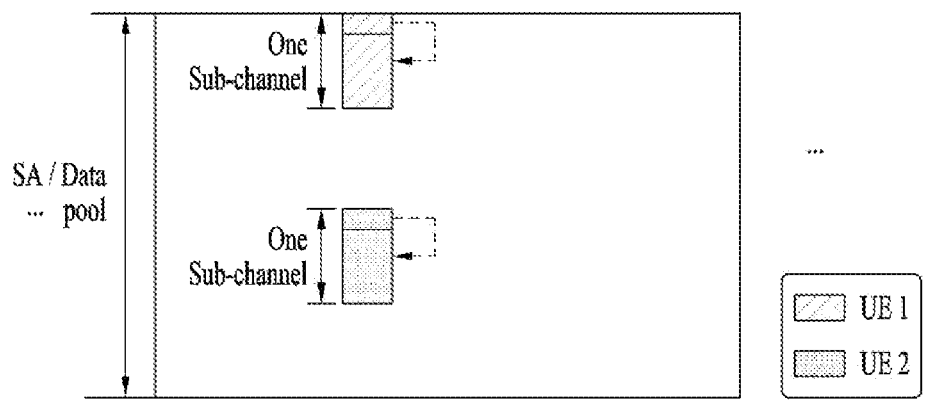

Unlike D2D, an SA (PSCCH) and data (PSSCH) are frequency-division multiplexed (FDM) and transmitted in V2X, that is, sidelink transmission mode 3 or 4. Because latency reduction is a significant factor in V2X in view of the nature of vehicle communication, an SA and data are FDM and transmitted on different frequency resources of the same time resources. Examples of this transmission scheme are illustrated in FIG. 12. An SA and data may not be contiguous to each other as illustrated in FIG. 12(a) or may be contiguous to each other as illustrated in FIG. 12(b). Herein, a basic transmission unit is a subchannel. A subchannel is a resource unit including one or more RBs on the frequency axis in predetermined time resources (e.g., a subframe). The number of RBs included in a subchannel, that is, the size of the subchannel and the starting position of the subchannel on the frequency axis are indicated by higher-layer signaling.

In V2V communication, a cooperative awareness message (CAM) of a periodic message type, a decentralized environmental notification message (DENM) of an event triggered message type, and so on may be transmitted. The CAM may deliver basic vehicle information including dynamic state information about a vehicle, such as a direction and a speed, static data of the vehicle, such as dimensions, an ambient illumination state, details of a path, and so on. The CAM may be 50 bytes to 300 bytes in length. The CAM is broadcast, and its latency should be shorter than 100 ms. The DENM may be generated, upon occurrence of an unexpected incident such as breakdown or an accident of a vehicle. The DENM may be shorter than 3000 bytes, and received by all vehicles within a transmission range. The DENM may have a higher priority than the CAM. When it is said that a message has a higher priority, this may mean that from the perspective of one UE, in the case of simultaneous transmission of messages, the higher-priority message is transmitted above all things, or earlier in time than any other of the plurality of messages. From the perspective of multiple UEs, a message having a higher priority may be subjected to less interference than a message having a lower priority, to thereby have a reduced reception error probability. Regarding the CAM, the CAM may have a larger message size when it includes security overhead than when it does not.

New Radio Access Technology (New RAT or NR)

As more and more communication devices require a larger communication capacity, there is a need for enhanced mobile broadband communication beyond legacy RAT. In addition, massive Machine Type Communications (MTC) capable of providing a variety of services anywhere and anytime by connecting multiple devices and objects is another important issue to be considered for next generation communications. Communication system design considering services/UEs sensitive to reliability and latency is also under discussion. As such, introduction of new radio access technology considering enhanced mobile broadband communication (eMBB), massive MTC, and ultra-reliable and low latency communication (URLLC) is being discussed. In the present disclosure, for simplicity, this technology will be referred to as NR.

Figure 13:
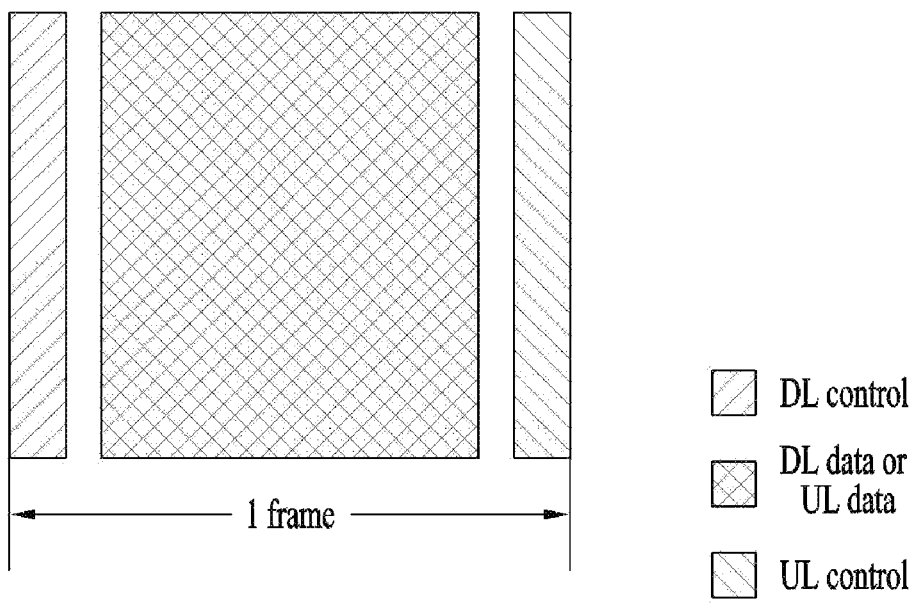
FIGS. 13 and 14 is a view illustrating a new radio access technology (NRAT) frame structure.
Figure 14:
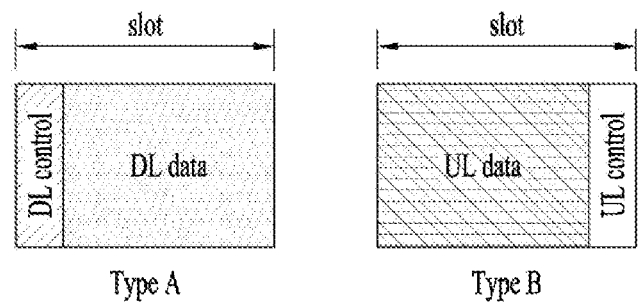
Figure 14:
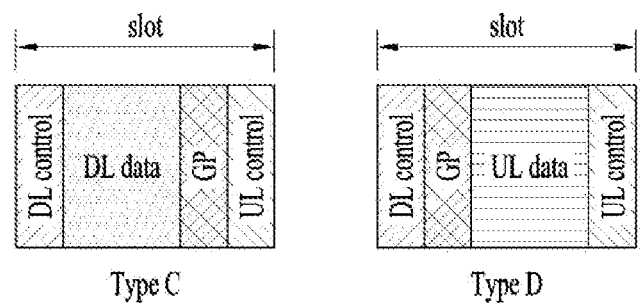

FIGS. 13 and 14 illustrate an exemplary frame structure available for NR. Referring to FIG. 13, the frame structure is characterized by a self-contained structure in which all of a DL control channel, DL or UL data, and a UL control channel are included in one frame. The DL control channel may deliver DL data scheduling information, UL data scheduling information, and so on, and the UL control channel may deliver ACK/NACK information for DL data, CSI (modulation and coding scheme (MCS) information, MIMO transmission-related information, and so on), a scheduling request, and so on. A time gap for DL-to-UL or UL-to-DL switching may be defined between a control region and the data region. A part of a DL control channel, DL data, UL data, and a UL control channel may not be configured in one frame. Further, the sequence of channels in one frame may be changed (e.g., DL control/DL data/UL control/UL data, UL control/UL data/DL control/DL data, or the like)

Meanwhile, carrier aggregation may be applied to D2D communication to improve data transfer rates or reliability. For example, upon receiving signals on aggregated carriers, a receiving UE may perform combining or joint-decoding thereon or forward decoded signals to higher layers so as to perform (soft) combining on the signals which are transmitted on the different carriers. For such operation, the receiving UE needs to know which carriers are aggregated, that is, which signals on which carriers the receiving UE needs to combine. Accordingly, the radio resources on the aggregated carriers needs to be informed. In 3GPP Rel. 14 V2X, a transmitting UE directly indicates the location of a time-frequency resource for transmitting data (PSSCH) using a control signal (PSCCH). If the carrier aggregation is indicated by the PSCCH, an additional bit field may be required for the indication. However, the remaining reserved bits of the PSCCH are about 5 to 7 bits, and these bit are insufficient. Hence, a method capable of indicating radio resources on aggregated carriers is required, and details thereof will be described in the following.

Minimization of Drive Test

Minimization of drive test (MDT) is a mechanism introduced in 3GPP Release 10 to provide a network performance optimization tool to a network operator in a cost-efficient manner A measurer carries measurement equipment on a vehicle and collects DL throughput and wireless environment information according to a location. This is referred to as a drive test. An existing drive test is very laborious in that the measurer should repeatedly conduct a measurement task for a long time and causes waste of time and frequency resources because the measurer directly measures signals generated by a plurality of eNBs at a plurality of points. Thus, costs for wireless network optimization and operation increase. As a scheme for minimizing waste of resources of the drive test, discussion about MDT in 3GPP and standardization for MDT have been conducted. The core of MDT is to allow the eNB to collect MDT data, which is radio environment information and other additional information measured at the UE. The drive test may be minimally performed and a cellular network may be optimized by collecting the MDT.

Specifically, MDT introduced first in Release 10 is technology of receiving various radio measurement results from commercial UEs which are widely used and optimizing network parameters based on the received radio measurement results. MDT may remarkably reduce a vehicle test for obtaining radio environment information. In Release 10, which place of a cell and when an error occurs in the UE are supposed to be recorded and reported by focusing on optimization of cell coverage. In Release 11, the MDT technology is more developed so that quality of service (QoS)-related performance, such as the amount of data that the UE actually receives or data reception velocity, is supposed to be recorded and reported. In Release 12, MDT is combined with a multimedia broadcast/multicast service (MBMS) so that MBMS reception performance is supposed to be recorded and reported. Since the MBMS introduced first in Release 9 is a structure without feedback as point-to-multipoint communication, the eNB is not aware of at which degree of power and at which degree of error rate an individual UE receives data. To overcome these disadvantages, received power or an error rate during MBMS reception by the UE are supposed to be recorded and reported in Release 12, so that the eNB may provide the MBMS with an optimal value. In Release 13, as multi-media telephony (MMTEL) voice and video are activated, further enhancement of an MDT (FeMDT) study item (SI) for a measurement and result collection method related to MMTEL voice and video has been started and a standard specification task for an SI result has been conducted. In Release 13, layer-2 protocol related content for measuring and reporting a packet error rate (i.e., a packet loss rate, a packet discard rate, or packet delay) for QoS improvement of the UE has mainly been discussed as follows.

Packet loss rate measurement in DL/UL serves to measure transmission loss that may be present in a Uu interface between the eNB and the UE and has been determined such that the eNB performs measurement with respect to each UE according to a conventional measurement method predefined in Layer 2 Measurements of TS 36.314.

Packet discard rate measurement in UL may be defined as a scheme of logging the number of discarded packet data convergence protocol (PDCP) service data units (SDUs) and informing the eNB of the logged number of discarded PDCP SDUs. In this case, the UE separately logs the number of PDCP SDUs according to whether sequence numbers of the PDCP SDUs are assigned, so that the eNB receiving a UL packet may be aware of a lost or discarded state of corresponding data.

Packet delay measurement on DL may be performed by the eNB with respect to each UE according to the conventional measurement method predefined in Layer 2 Measurements of TS 36.314. Packet delay measurement in UL has not been defined in Layer 2 Measurements of TS 36.314 Layer 2 and has been newly defined. The UE may measure UL packet queuing delay for all PDCP SDUs transmitted during a measurement period. That is, the UE may measure time from a moment at which PDCP SDUs arrive at a PDCP upper service access point to a moment at which even a part of the PDCP SDUs arrives at a MAC layer. The UE reports, to the eNB, the ratio of the number of PDCP SDUs in which UL packet queuing delay is equal to or greater than a predetermined threshold to the total number of PDCP SDUs measured at every measurement cycle. As such, the eNB may be aware of whether there is a problem in UL scheduling of the UE.

The UE may report, to the eNB, not only such higher-layer measurement information but also measurement values, such as reference signal received power (RSRP), reference signal received quality (RSRQ), power headroom (PH), data volume, scheduled IP throughput, a signal-to-interference-plus-noise ratio (SINR), a rank indicator (RI), a channel quality indicator (CQI), a precoding matrix index (PMI), a modulation and coding scheme (MCS), and DL acknowledgement/negative acknowledgement (ACK/NACK).

Figure 15:
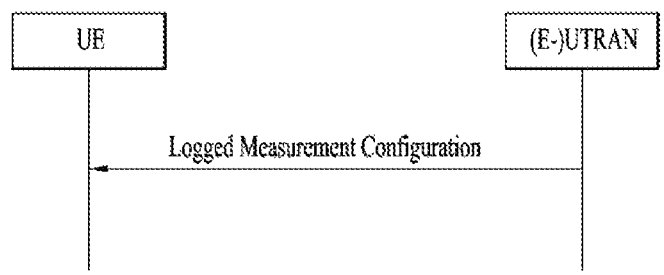
FIG. 15 is a diagram illustrating reception of MDT measurement configuration for MDT logging.

The UE may immediately report the above measurement information or measurement values as soon as measurement is performed through an immediate-MDT procedure, or store the above measurement information or measurement values in a memory and report a stored result through a logged-MDT procedure. According to the definition of logging, the UE stores and accumulates a measurement result. A network may instruct the UE to configure logged measurement as illustrated in FIG. 15 and the UE may perform logging according to instruction. For example, the network may configure a cell/tracking area/public land mobile network (PLMN) for which the UE should perform MDT and the UE may report all or a part of the above information to the network. In this case, the measurement information of the UE may be linked to a time stamp and location information.

Hereinafter, a method of reporting the quality of a radio link to the eNB or a fixed node in D2D communication, V2V communication, or communication between a vehicle and a UE will be described. The method of reporting the quality of the radio link will be described based on V2X communication for convenience of description. However, the method may also be applied to the quality reporting method in general D2D communication.

QoS Reporting and Logging Method for V2X Communication

In V2X communication or D2D communication, communication between UEs, rather than communication between a cellular network and a UE, is performed. Operators may desire to confirm how smoothly V2X communication is performed in a network thereof. Particularly, since a part of a V2X communication service is related to safety, if V2X communication is not smoothly performed in a specific area, safety of vehicles may be seriously endangered. Therefore, V2X MDT may be introduced to measure/report/predict the quality of V2X communication with respect to each region and each situation.

All or a part of information described below may be logged in the memory of the UE by network configuration. Information logged for a predetermined time may be reported to the network or reported to the network as soon as measurement is performed. Upon reporting the logged information to the network (eNB), the UE may configure an RRC message including the logged information and report the logged information through a signaling radio bearer (SRB).

When the UE logs information described later, a method of logging the information and a method of logging statistics on the information may be used with respect to individual transmission. When statistical information is logged, the statistical information may be logged with respect to each unit time duration and/or each unit area so that the meaning of the logged information may be clarified. When the UE logs the statistical information with respect to each unit time duration and/or each unit area, if either a current time or a current location deviates from a unit duration boundary, the UE may configure and then log new statistical information. Each time duration and each regional duration may be configured not to be overlapped. The statistical information may log an average or a variance of corresponding measurement information. Alternatively, statistical information such as a cumulative distribution function (CDF), a probability mass function (PMF), or histogram may be configured so as to log more detailed statistical information.

According to an embodiment, the UE may log information about statistics related to data transmission. Sidelink versions of logged information in 3GPP MDT described above may be logged by the UE.

Specifically, the amount of transmitted packets, throughput information, a packet loss rate in sidelink, a packet discard rate in sidelink, and packet delay in sidelink may be measured and/or reported as sidelink quality. The above information in a legacy cellular network has been measured with respect to every QoS class identifier (QCI). However, if an additional QCI is not defined in sidelink communication (or V2X communication or D2D communication), the packet loss rate or the delay/discard rate may be measured with respect to each proximity service (ProSe) per-packet priority (PPPP) or ProSe per-packet reliability (PPPR). Alternatively, a measurement value for each sidelink radio bearer mapped to each sidelink logical channel or each logical channel may be logged. In addition, the following information may be V2X-characteristically logged.

Specifically, information about the size of a generated packet may be logged. The size of the generated packet may differ according to a V2X application/service, a device type, or a surrounding environment. Information about how many packets are generated for a specific application/service/PPPP in a certain region may be logged.

Alternatively, information about an interval at which a packet is generated may be logged. In V2X communication, a message may be generated under a specific condition. Since an interval at which the message is generated may differ according to a UE, information about at which interval the packet is generated in a certain region may be logged.

Alternatively, information about an average time staying in a queue until transmission of a packet is ended after the packet is generated may be logged. If resource congestion becomes severe so that the UE fails to select a proper resource, if a channel occupancy ratio is remarkably reduced so that time to completely transmit packets is consumed, or if too many packets are generated in terms of the UE, time during which packets stay in a queue may increase. In this case, the information may be separately logged according to whether it takes a long time to transmit packets due to reduction in radio resources or whether packets stay in a queue due to generation of many packets. Here, the queue may be a transmission buffer of a radio link control (RLC) entity. Alternatively, the queue may be stored in the transmission buffer of the MAC layer as the queue information for measuring transmission delay due to HARQ retransmission of the MAC layer. The network may configure queueing information in a transmission buffer of a specific layer such that the UE logs the queueing information.

Alternatively, the number/ratio of dropped packets may be logged. Specifically, how many packets are dropped or why packets are dropped in a specific time duration may be logged.

Alternatively, information about an air transmission time may be logged. Specifically, information about time during which the UE actually performs transmission via air in a specific time duration (information about a time stamp, a slot number, or a D2D subframe number) may be logged. The network may be aware of D2D performance of a corresponding region/time through reception logging of a reception UE for this transmission.

Alternatively, information about the amount of frequency resources or a channel utilization ratio (CR), used to transmit packets, may be logged. That is, information about the amount of radio resources or the CR, used by the UE during a predetermined time, may be reported to the network.

Alternatively, information about an MCS may be logged. Specifically, which moderation order is used or which coding rate is used may be logged.

Alternatively, information about which MIMO scheme is used may be logged. Specifically, the number of layers, the number of codewords, a precoder index, or use/non-use of a diversity scheme may be logged.

Alternatively, information about a carrier aggregation (CA) capability/status may be logged. Whether CA is applied may be logged or the number of carriers supported in sidelink CA, as well as the above-mentioned MIMO scheme or an MCS, may be logged.

Alternatively, information about transmission power and/or power PH may be logged. When the range of transmission power available for PPPP is determined, a power value that the UE actually uses, PH relative to maximum transmission power allowed for a specific PPPP, or PH relative to maximum transmission power allowed for the UE may be logged.

Alternatively, information about how many times resource reselection is triggered or how frequently resource reselection is triggered, and/or information about a triggering cause may be logged. In sensing with a semi-persistent transmission method and/or another resource selection method of 3GPP Rel. 14, information about whether a resource generated during a predetermined time duration is reselected may be logged. Resource reselection may be generated due to various causes. For example, when the size of reserved resources is not proper as compared with the amount of packets to be transmitted (or when the size of reserved resources is less than the amount of packets to be transmitted), when a resource region used by the UE is changed, when it is expected that a selected resource will be incapable of satisfying a latency requirement, when use of pre-reserved resources is ended (when a counter value expires), and/or when resource reselection is triggered by another UE, resource reselection may occur. Through these parameters (or logging information), the network may indicate a resource selection scheme suitable for a specific resource pool (whether the resource selection scheme is a semi-persistent scheduling (SPS)-like resource selection, resource selection for an aperiodic packet, or a carrier sense multiple access/collision avoidance (CSMA/CA) scheme) or differently configure the amount of available resources per UE/PPPP/channel busy ratio (CBR)/synchronization reference type.

Alternatively, information about sidelink ACK/NACK may be logged. When sidelink HARQ ACK/NACK feedback is introduced, a specific transmission UE may log ACK/NACK information for a packet transmitted thereby. However, when HARQ ACK feedback is not introduced (e.g., when HARQ feedback is not introduced in multicast/broadcast), ACK/NACK information for a packet may not be logged. Alternatively, when HARQ NACK feedback is introduced in multicast/broadcast, information about the number of NACK transmissions and/or about whether NACK is fed back may be logged.

Alternatively, information about distinguishment between sidelink and UL/DL may be logged. The UE may perform a Uu-based V2X service and a PC5-based V2X service. Information about transmitted traffic per interface may be separately logged. All (or a part) of information about the amount of packets/packet type/priority and/or the above-mentioned transmission related statistics may be separately logged according to interface and/or UL/sidelink.

Alternatively, information about distinguishment between scheduling modes may be logged. The amount of transmitted packets may differ between a mode in which the eNB performs scheduling even in sidelink and a mode in which the UE selects a resource. The transmission UE may distinguishably log information about packets transmitted in the respective modes. Alternatively, information about the number of use of a specific mode in a specific time duration, a ratio of use of a specific mode, or packets transmitted in a specific mode may be logged.

Alternatively, the above-described logged information may be composed of information measured for each PPPP or PPPR.

Alternatively, when unicast transmission related information is logged, the UE may also log a recipient ID of a transmission packet. The recipient ID may be a layer-2 destination ID. Here, the above-proposed data transmission related statistics per recipient ID may be logged.

Alternatively, information about a channel status related metric may be logged. For example, information about a congestion related metric, such as a CBR or a CR, may be logged.

According to an embodiment, the UE may log data reception related statistics. For example, the UE may log information about a data demodulation related metric.

Specifically, the UE may log information about a block error rate (BLER), a packet reception ratio (PRR), and/or a packet inter-reception time (PIR). The UE may measure an average/maximum/minimum BLER of a packet received during a predetermined time duration or the number of occurrences of a BLER equal to or greater than a predetermined threshold. Alternatively, the number of errors (e.g., the number of CRC failure, the number of decoding errors of a MAC PDU, or the number of errors of a PDCP or an SDU) during a predetermined time duration may be measured. Alternatively, a time difference (PIR) between received packets from the same UE may be measured. For this purpose, an indicator/identifier indicating a specific UE may be included in a control signal and a source ID may be included in a higher-layer signal. The UE may record a time difference between received packets of the same source ID.

Alternatively, the UE may log information about a channel status related metric and/or a congestion related metric. Specifically, a signal quality related metric may include information about RSRP, a received signal strength indicator (RSSI), RSRQ, or an SINR for sidelink. The congestion related metric may include information about a CBR or a CR. The above-described metrics are parameters for identifying a current channel situation and how much congestion occurs. In this case, the network or the eNB may receive logging of a channel status observed per UE. In this case, parameters related to signal quality may be recorded with respect to each received packet or each sub-channel. The congestion related metric may be logged with respect to each UE and/or each resource pool.

Alternatively, information about distinguishment between DL reception and sidelink reception may be logged. Like logging of the data transmission related statistics, reception performance of a Uu interface and reception performance of a PC5 interface may be separately logged. Alternatively, DL reception performance and sidelink reception performance may be distinguished. Particularly, the UE may consider a method of duplicating and then transmitting a packet with respect to each interface in order to improve the reliability of the same packet. In this case, reception performance for each interface may be separately logged. For example, an error possibility/the number of errors in the PC5 and Uu interfaces may be logged with respect to packets received from a specific UE or decoded during a predetermined time. More generally, an error possibility/the number of errors of total DL packets that have been received and/or decoded during a predetermined time duration and an error possibility/the number of errors of sidelink packets that have been decoded may be separately logged.

Alternatively, information about a mode may be logged. Even in sidelink, reception performance of a mode in which the eNB performs scheduling and reception performance of a mode in which the UE selects a resource may differ. In terms of a reception UE, reception performance of any mode and reception performance of another mode may be separately logged. To this end, an indicator for distinguishing between the modes may be included and signaled by a physical layer or higher layer signal.

Alternatively, information about reception performance of each transmission format may be logged. Reception performance of a packet may be separately measured according to a MIMO transmission scheme of the transmission UE, a modulation order, reception performance per MCS, application/non-application of CA, or application/non-application of a scheme of duplicating the same packet on multiple carriers and transmitting the duplicated packet in order to improve packet duplication (reliability).

Reception performance of each RAT may be logged. Specifically, reception performance when a specific RAT is used may be separately logged. For example, the performance of an LTE-based PC5 interface and the performance/channel quality/congestion level of an NR-based PC5 interface may be separately logged. This serves to cause the eNB or the UE to predict the performance of any RAT and indicate that the UE should use a specific RAT.

Information for distinguishing reception performance of each UE may be logged. An ID of a transmitter may be included in a reception logging entry. This may be used to cause the network to identify the performance of a specific D2D link (including broadcast) in a specific area and/or at a specific time.

Information about air transmission time information may be logged. Information that the UE actually attempts to receive through radio frequency (RF) in a specific time duration may be logged. The network matches this information with the air transmission time information of the reception UE, thereby identifying D2D performance in each area and/or at each time per region/time.

According to an embodiment, information about statistics related to positioning performance may be logged. Specifically, information as to how well positioning is performed or to which degree logged positioning information is accurate may be needed. To this end, positioning related quality metric including at least one of a satellite carrier-to-noise density ratio (C/No), a carrier phase, PRS RSRP, a positioning error, or the number of qualified satellites may be logged. Alternatively, not only the quality of a global navigation satellite system (GNSS) but also cellular-based positioning, the accuracy of measurement, or the quality of a positioning signal may be measured.

According to an embodiment, information about synchronization performance statistics may be logged. For example, the information about synchronization performance statistics may include information about a synchronization reference of the eNB or the UE and time during which specific synchronization reference is maintained. Specifically, if a specific UE is determined as the synchronization reference, the information about synchronization performance statistics may include information about the quality of a measured synchronization signal (e.g., S-RSRP).

Alternatively, if the eNB is determined as the synchronization reference, the information about synchronization performance statistics may include information about the quality of a signal of the eNB (e.g., RSRP or RSRQ). The information about synchronization performance statistics including information about a time and an area during and in which the GNSS is lost may be logged.

Alternatively, information about the velocity or a traveling route of a vehicle may be logged and reported to the network.

Information about the number of perceived objects or the quality of a sensor may be logged. Specifically, the quality information may include information as to whether sensor detection is properly performed in a specific area and information as to whether a sensor operation is not properly performed in a specific area, and information about a cause of an abnormal operation of the sensor. When the operation of the sensor is not properly operated in a specific area (e.g., the recognition rate of the sensor is lowered due to darkness), a measure in the specific area (e.g., installation of a street light) may be taken, a mode may be transitioned when passing through the specific area (e.g., a headlight boost may be triggered or self-driving is off-triggered), or the number of provided objects or the quality/confidence level of the sensor may be logged in order to inform a related organization (a government or ITS-related organization).

The above logged information may be separately logged in a below-described manner Logging configuration regarding which logging scheme will be used may be indicated by the network or pre-logging configuration may be determined. Specifically, the following logging method may be applied.

A detailed distinguishment method of measurement according to an embodiment is as follows. QoS of a specific priority/reliability/application may be distinguished. Specifically, if the UE is interested in the QoS of a specific priority/(target) reliability or a specific application, measurement may be separately performed according to priority/reliability, PPPP/PPPR, or application.

The UE may perform a quality-selective logging method. If a BLER, PRR, PIR, RSRP/RSRQ/RSSI, and/or CBR is below (or above) a predetermined threshold in a predetermined time-frequency duration, a demodulation related metric or signal quality related metric of a corresponding area may be logged.

The UE may log separate QoS according to each specific resource pool, zone, location, lane, or traveling direction. When the UE is interested in QoS in each specific resource pool or zone, specific geographical position (e.g., intersection), lane, or traveling direction, separate measurement or a separate measurement value may be logged according to the resource pool, zone, location, lane, or traveling direction. The UE may separately measure or separately log quality information according to distance from a transmitter or a receiver of another UE. That is, since a metric such as a packet success possibility may differ according to distance to the transmitter (or the receiver when the transmitter performs reporting), the UE may measure quality information (QoS) in each distance duration (e.g., only when the transmitter is positioned between x meters and y meters) and perform separate logging. For example, the UE may separately log logged information about quality information including the packet success possibility in each distance duration from the transmitter or the receiver of another UE.

The UE may log QoS according to variation in area configuration. The network may configure an area according to an area (pool, zone, location, lane, or direction) level in which a cellular network is interested, rather than in existing cell level, and the UE may perform measurement, logging, and/or reporting in each area configured by the network.

Alternatively, the UE may time-selectively perform logging. For example, an absolute time, a relative time stamp, and a logging duration may be configured so that the UE may perform logging according thereto.

The UE may perform logging in each scheduling mode. Upon logging transmission information, the UE may separately log transmission-related logging information caused by eNB scheduling and transmission related logging information caused by UE autonomous scheduling. In this regard, the network may configure the UE such that the UE performs logging according to a scheduling method, the UE logs only transmission-related information caused by UE autonomous scheduling, or the UE logs only transmission-related information caused by network scheduling.

The UE may separately perform logging with respect to unicast or multicast (or broadcast). In the case of unicast, logging may be performed per receiver ID. In this regard, the network may configure the UE such that the UE logs only broadcast transmission, the UE logs only unicast transmission, the UE separately logs broadcast transmission and unicast transmission, or the UE integrates and logs for broadcast transmission and unicast transmission without distinguishing therebetween. If the UE is configured to perform unicast logging, the network may additionally configure the UE to perform the following logging. The network may configure the UE such that the UE separately performs logging according to a unicast receiver or the UE performs logging without distinguishing between unicast receivers.

The UE may perform logging with respect to a different sidelink RAT. For example, logging for each RAT may be divided into NR sidelink related logging and LTE sidelink related logging. Particularly, an LTE or NR UE may measure dedicated short-range communication (DSRC) QoS related information and the measured QoS may be individually reported to the eNB. The network may determine for which RAT logging is to be performed regardless of a location. The network may configure the UE to log a specific RAT in a specific area. The above two configurations may be mixed to be configured for the UE.

The UE may measure QoS of a vehicle type, a vehicle OEM, or a modem manufacturer. To evaluate the performance of a specific manufacturer, QoS of each manufacturer may be measured. In this case, an interaction may be needed between a higher layer and L1/L2 measurement.

The UE may perform Uu related measurement. RSRP of a specific synchronization signal block (SSB)/beam of a specific cell may be separately measured and logged. An additional measure may be taken if a beam of a specific direction is continuously blocked.

Hereinafter, how the UE reports the above-described logging information will be described.

Specifically, the UE may report the logging information using periodic, event-triggered, eNB-triggered, or MDT-like scheme (at the same time as performing logging). Alternatively, the UE may signal the logging information to a specific neighboring UE (a fixed UE, a road side unit (RSU), or a relay UE).

The logging information may be reported by multicast/broadcast MDT configuration. Specifically, the network may trigger immediate MDT in order to identify D2D (or sidelink) performance/environment of a specific area at a specific moment. To this end, the network may configure the UE to transmit immediate MDT only with respect to a logging target (area/time/frequency/pool/priority) through multicast/broadcast. A procedure in which the UE that has received configuration immediately reports measurement statistics through unicast may be introduced. For example, when specific QoS metric performance of a packet transmitted through sidelink is worse than a threshold value, the UE may be configured to transmit immediate MDT to the network. For example, the network may configure a threshold value of transmission delay per PPPP. If a threshold value of transmission delay is larger than a threshold value set for transmission delay of a packet corresponding to a configured PPPP, the UE may immediately report measured QoS to the network. Alternatively, the network may multicast/broadcast MDT configuration and the UE may perform logging according to a corresponding instruction and report logged MDT.

The contents of the present disclosure are not limited only to D2D communication and may be used on UL or DL. In this case, the eNB or the relay node may use the proposed methods.

Since examples of the above-described proposed methods may be included in one of implementation methods of the present disclosure, it is obvious that the examples may be regarded as proposed methods. Although the above-described proposed methods may be independently implemented, the proposed methods may be implemented in a combined (incorporated) form of parts of the proposed methods. A rule may be defined such that information as to whether the proposed methods are applied (or information about rules of the proposed methods) is indicated by the eNB to the UE or by the transmission UE to the reception UE through a predefined signal (e.g., a physical layer signal or a higher-layer signal).

Figure 16:
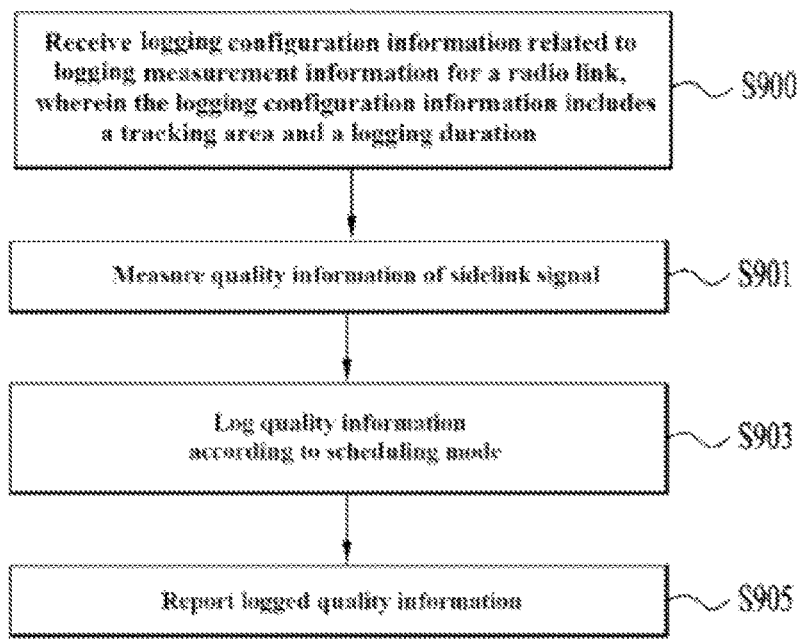
FIG. 16 is a diagram illustrating a method of logging quality information about sidelink according to an embodiment.

FIG. 16 is a diagram illustrating a method of logging quality information about sidelink according to an embodiment.

Referring to FIG. 16, the UE may receive logging configuration information related to logging measurement information for a radio link (S900). Here, the logging configuration information includes a tracking area and a logging duration. The UE may measure the quality of sidelink based on a sidelink signal of another UE. The UE may measure the quality of sidelink capable of being considered based on characteristics of sidelink.

According to an example, the UE may measure BLER, PRR, RSRP, RSRQ, RSSI, CR, and/or CBR, related to a sidelink signal, in consideration of characteristics of sidelink as quality information of sidelink.

The UE may include information about an MCS, information about a CA capability, and/or information about a MIMO scheme, related to the sidelink signal, in the quality information. Alternatively, the UE may include, in the quality information, how many times resource reselection for the sidelink signal is triggered or how frequently resource reselection for the sidelink signal is triggered, and/or information about why resource selection is triggered.

The UE may include, in the quality information, the size of a packet related to the sidelink signal, information about a generation interval of the packet, information about an average time staying in a queue before transmission of the packet, and/or information about a dropped ratio of the packet.

The UE may include, in the quality information, information about the quality of a reference synchronization signal for the sidelink signal, information about quality related to positioning of the UE, information about a recognition rate of a sensor included in the UE, geographical information of the UE, and/or information about mobility of the UE.

The UE may separately measure the quality information with respect to a PPPP or a PPPR. In other words, the UE may measure the quality information for each attribute and/or each packet.

Alternatively, the UE may separately measure the quality information with respect to a preconfigured resource pool, a mobile direction of the UE, and/or a geographical position. For example, when a first resource pool to a third resource pool are preconfigured for the UE, the UE may perform measurement by separating the quality information into quality information of a sidelink signal transmitted or received in the first resource pool, quality information of a sidelink signal transmitted or received in the second resource pool, and/or quality information of a sidelink signal transmitted or received in the third resource pool. The UE may perform measurement by separating the quality information into quality information of sidelink measured in a first traveling direction and quality information of sidelink measured in a second traveling direction. The UE may separately measure the quality information with respect to a preset geographical area. For example, the quality information may include quality information measured in a first geographical area and quality information measured in a second geographical area.

The UE may measure a part of the quality information with respect to each packet and measure the other part of the quality information with respect to each resource pool.

Specifically, quality information about RSRP, RSRQ, and/or RSSI may be measured with respect to the packet and quality information about a CBR and/or a CR may be measured with respect to the resource pool.

Next, the UE may log the quality information. The UE may separately log the quality information according to characteristics of sidelink. Specifically, the UE may perform logging by separating the quality information according to a scheduling mode, RAT (LTE or NR), a geographical area, and/or an interface (UL/DL and sidelink).

According to an example, the UE may separately log the quality information according to a resource scheduling mode for the sidelink signal. The resource scheduling mode for the sidelink signal may include a first scheduling mode in which a resource for the sidelink signal is scheduled by the eNB and a second scheduling mode in which the UE directly (autonomously) schedules the resource for the sidelink signal in a preset resource pool. For example, the UE may separately log quality information measured when the resource for the sidelink signal is allocated according to the first scheduling mode and quality information measured when the resource for the sidelink signal is selected according to the second scheduling mode. For example, the UE may log the quality information related to the first scheduling mode as first logging information and log the quality information related to the second scheduling mode as second logging information which is different from the first logging information. Quality information measured with respect to PPPP or PPPR may be logged as the first logging information. Likewise, quality information measured with respect to PPPP or PPPR may be logged as the second logging information.

Next, the UE may report the logged quality information to an eNB, an RSU, or another UE. The UE may report the logged quality information to the eNB etc immediately, at a preset period, and/or when a specific requirement is satisfied.

According to an example, the UE may report the logged quality information to the eNB when a specific requirement is satisfied. The specific requirement is when a BLER, PRR, RSRP, RSRQ, RSSI, and/or CBR is below (or above) a preset threshold value. For example, the UE may report the logged quality information to the eNB when CBR among quality values of sidelink is less than a preset threshold value. Alternatively, the UE may report the logged quality information to the eNB when BLER among the quality values of sidelink is equal to or greater than the preset threshold value.

Figure 17:
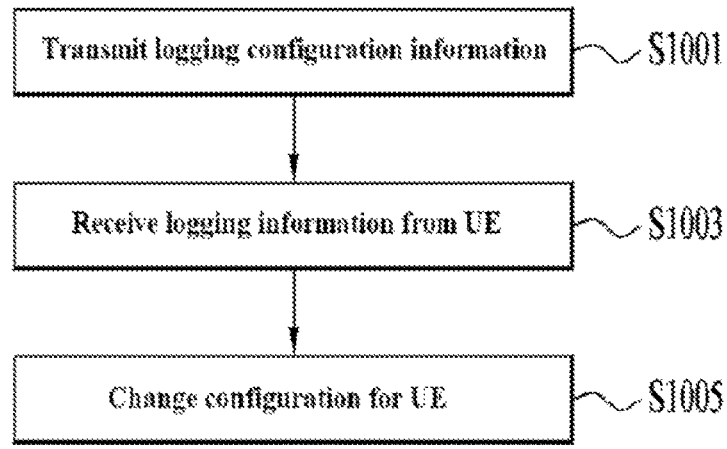
FIG. 17 is a diagram illustrating a method of configuring and reporting logging between an eNB and a UE according to an embodiment.

FIG. 17 is a diagram illustrating a method of configuring and reporting logging between an eNB and a UE according to an embodiment.

Referring to FIG. 17, the eNB may transmit logging configuration information related to logging to the UE through a higher-layer signal or a physical layer signal. The logging configuration information may include quality information of sidelink to be measured, and configuration information about a measurement method of the quality information, a logging method of the measured quality information, and/or a reporting method of the logged quality information.

Specifically, the eNB may transmit, to the UE, logging configuration information including information specifying the quality information of sidelink for determining whether sidelink is in a smooth state. For example, the eNB may transmit, to the UE, the logging configuration information indicating that at least one quality information to be logged among the quality information described with reference to FIG. 16 (or among the above-described quality information) should be reported.

The eNB may transmit, to the UE, the logging configuration information indicating whether to measure quality information with respect to a packet (or packet unit), a PPPP, a PPPR, a resource pool, a geographical position, and/or a traveling direction. The eNB may transmit, to the UE, the logging configuration information, indicating (or configuring) that a part of the quality information should be measured with respect to a PPPP (or a packet, a PPPR, a resource pool, a geographical position, or a traveling direction) and the other part of the quality information should be measured with respect to a geographical position (or a packet, a PPPR, a resource pool, or a traveling direction). The UE may determine the quality information (quality information related to data demodulation or quality information about a channel status) according to the logging configuration information with respect to a measurement unit (a packet, a PPPR, a resource pool, a geographical position, or a traveling direction).

The eNB may transmit, to the UE, the logging configuration information indicating or configuring a unit in which the measured quality information is to be logged. For example, the eNB may configure the logging configuration information such that the measured quality information is separately logged according to a scheduling mode or is separately logged according to a RAT (LTE or NR) and/or an interface (UL/DL and sidelink). That is, the eNB may transmit configuration information related to a classification method when the quality information is logged to the UE through the logging configuration information.

Alternatively, the eNB may configure a timing at which the logged quality information is reported through the logging configuration information. The eNB may indicate that the UE should transmit the logged quality information periodically, at the same time when measurement is performed, or at a specific timing. The specific timing may be defined as a timing when a BLER, PRR, RSRP, RSRQ, RSSI, and/or CBR is measured as a value below (or above) a preset threshold.

Next, the eNB may receive the measured and logged quality information (or logging information) according to the transmitted logging configuration information. The eNB may estimate the quality of sidelink with respect to an area, a scheduling mode, and/or an interface based on the received logging information.

Next, the eNB may determine whether to change a scheduling mode, an MCS, or an interface based on the received logging information and the estimated quality of sidelink. If the quality of sidelink is less than a preset threshold with respect to a specific scheduling mode or a specific interface based on the received logging information, the eNB may transmit configuration change information indicating that a scheduling mode or an interface for sidelink should be changed to the UE.

Figure 18:
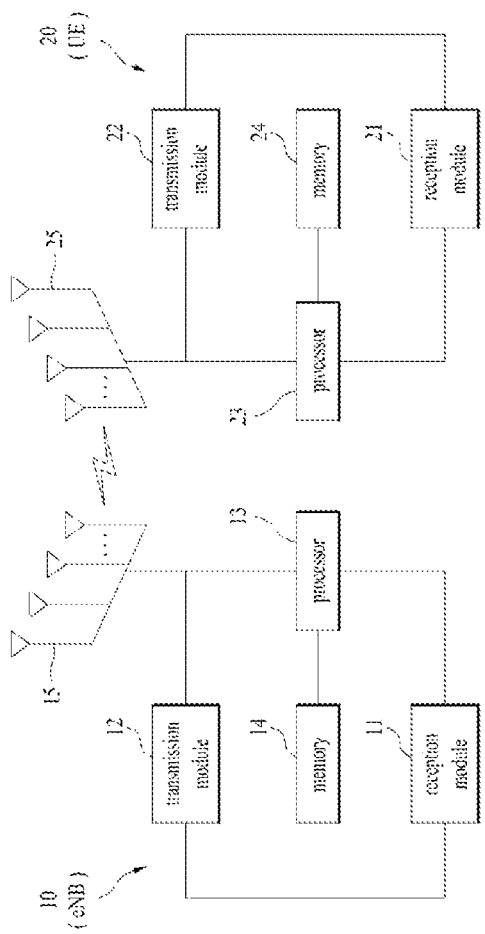
FIG. 18 is a diagram schematically illustrating a UE and an eNB for performing sidelink communication according to the present disclosure.

FIG. 18 is a diagram schematically illustrating a UE and an eNB for performing sidelink communication according to the present disclosure.

Referring to FIG. 18, a UE 20 may include a reception module 21, a transmission module 22, a processor 23, a memory 24, and a plurality of antennas 25. Use of the plural antennas 25 means that the UE supports MIMO transmission and reception. The reception module 21 may receive various signals, data, and information on DL from the eNB. The transmission module 22 may transmit various signals, data, and information on UL to the eNB. The processor 23 may control overall operation of the UE 20.

The processor 23 of the UE 20 according to an embodiment of the present disclosure may process operations required for the above-described embodiments.

Specifically, the processor 23 may log quality information measured for a sidelink signal. The processor 23 may control the transmission module 22 to report the logged quality information to the eNB. The processor 23 may separately log the quality information according to a scheduling mode of a resource for the sidelink signal. The scheduling mode includes a first scheduling mode in which the eNB schedules the resource for the sidelink signal for the UE and a second scheduling mode in which the UE schedules the resource for the sidelink signal in a preset resource pool.

The processor 23 may measure the quality information with respect to a PPPP or a PPPR. Alternatively, the processor 23 may separately measure the quality information according to the preset resource pool, a traveling direction of the UE, or a geographical position of the UE.

The processor 23 may report the logged quality information to the eNB when at least one of a BLER, a PRR, RSRP, RSRQ, an RSSI, or a CBR (Channel busy ratio) is less than a preset threshold value.

The processor 23 may include, in the quality information, at least one of the size of a packet related to the sidelink signal, information about a generation interval of the packet, information about an average time staying in a queue before transmission of the packet, or information about a dropped ratio of the packet.

The processor 23 may include, in the quality information, at least one of information about an MCS, information about CA capability, or information about a MIMO scheme, related to the sidelink signal. The processor 23 may include, in the quality information, information about how many times resource reselection for the sidelink signal is triggered or how frequently resource reselection for the sidelink signal is triggered. The processor 23 may include, in the quality information, at least one of information about quality of a reference synchronization signal, information about quality related to positioning, information about a recognition rate of a sensor included in the UE, or information about mobility of the UE. The processor 23 may include, in the quality information, at least one of a CR or a CBR. The processor 23 may include, in the quality information, at least one of a BLER, a PRR, or PIR, measured for the received sidelink signal. The PIR may be a measurement value for a time difference between received sidelink signals having an equal source ID.

The quality information includes first quality information obtained by measuring RSRP, RSRQ, or an RSSI of each packet and second quality information obtained by measuring a CBR or a CR of each preset resource pool.

The processor 23 may control the reception module 21 to receive logging configuration information from the eNB. The processor 23 may report only one of quality information logged for the first scheduling mode and quality information logged for the second scheduling mode, based on the logging configuration information, to the eNB.

The processor 23 of the UE 20 processes information received by the UE 20 and information to be transmitted to the outside of the UE 10. The memory 24 may store the processed information for a predetermined time and may be replaced with a component such as a buffer (not shown).

Referring to FIG. 18 again, the eNB 10 according to the present disclosure may include a reception module 11, a transmission module 12, a processor 13, a memory 14, and a plurality of antennas 15. Use of the plural antennas 15 means that the eNB supports MIMO transmission and reception. The reception module 11 may receive various signals, data, and information on UL from the UE. The transmission module 12 may transmit various signals, data, and information on DL to the UE. The processor 13 may control overall operation of the eNB 20.

The processor 13 of the eNB 10 according to an embodiment of the present disclosure may process operations required for the above-described embodiments.

Figure 19:
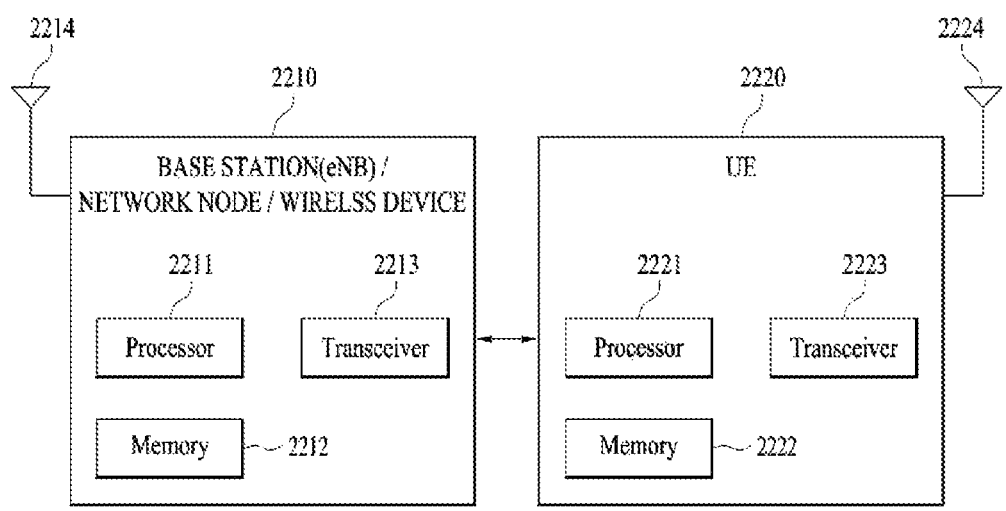
FIG. 19 is a block diagram of wireless communication devices according to an embodiment of the present disclosure.

FIG. 19 is a block diagram of wireless communication devices according to an embodiment of the present disclosure.

Referring to FIG. 19, a wireless communication system may include a BS (eNB) 2210 and a UE 2220. The UE 2220 may be located in the coverage of the BS 2210. In some embodiments, the wireless communication system may include a plurality of UEs. Although FIG. 19 shows the BS 2210 and the UE 2220, the present disclosure is not limited thereto. For example, the BS 2210 may be replaced with a network node, a UE, a radio device, etc. Alternatively, each of the BS and UE may be substitute with a radio communication device or a radio device.

The BS 2210 may include at least one processor 2211, at least one memory 2212, and at least one transceiver 2213. The processor 2211 may be configured to process the details of the embodiments to implement the functions, procedures, or methods described above in the embodiments.

In addition, the processor 2211 may implement at least one protocols. For example, the processor 2211 may implement one or more radio interface protocol layers (e.g., functions layers). The memory 2212 may be connected to the processor 2211 and store various types of information and/or instructions. The transceiver 2213 may be electrically connected to the processor 2211 and transmit and receive radio signals under the control of the processor 2211.

The UE 2220 may include at least one processor 2221, at least one memory 2222, and at least one transceiver 2223. The processor 2221 may perform the operations required for the embodiments to implement the functions, procedures or methods described above in the embodiments.

In addition, the processor 2221 may implement one or more protocols. For example, the processor 2221 may implement one or more radio interface protocol layers (e.g., functional layers). The memory 2222 may be connected to the processor 2221 and configured to store various types of information and/or instructions. The transceiver 2223 may be electrically connected to the processor 2221 and configured to transmit and receive radio signals under the control of the processor 2221.

The memory 2212 and/or 2222 may be located inside or outside the processor 2211 and/or 2221 and connected to the processor 2211 and/or 2221 in various ways such as wireless or wired connections.

Each of the BS 2210 and/or the UE 2220 may have a single antenna or multiple antennas. For example, an antenna 2214 and/or 2224 may be configured to transmit and receive radio signals.

Figure 20:
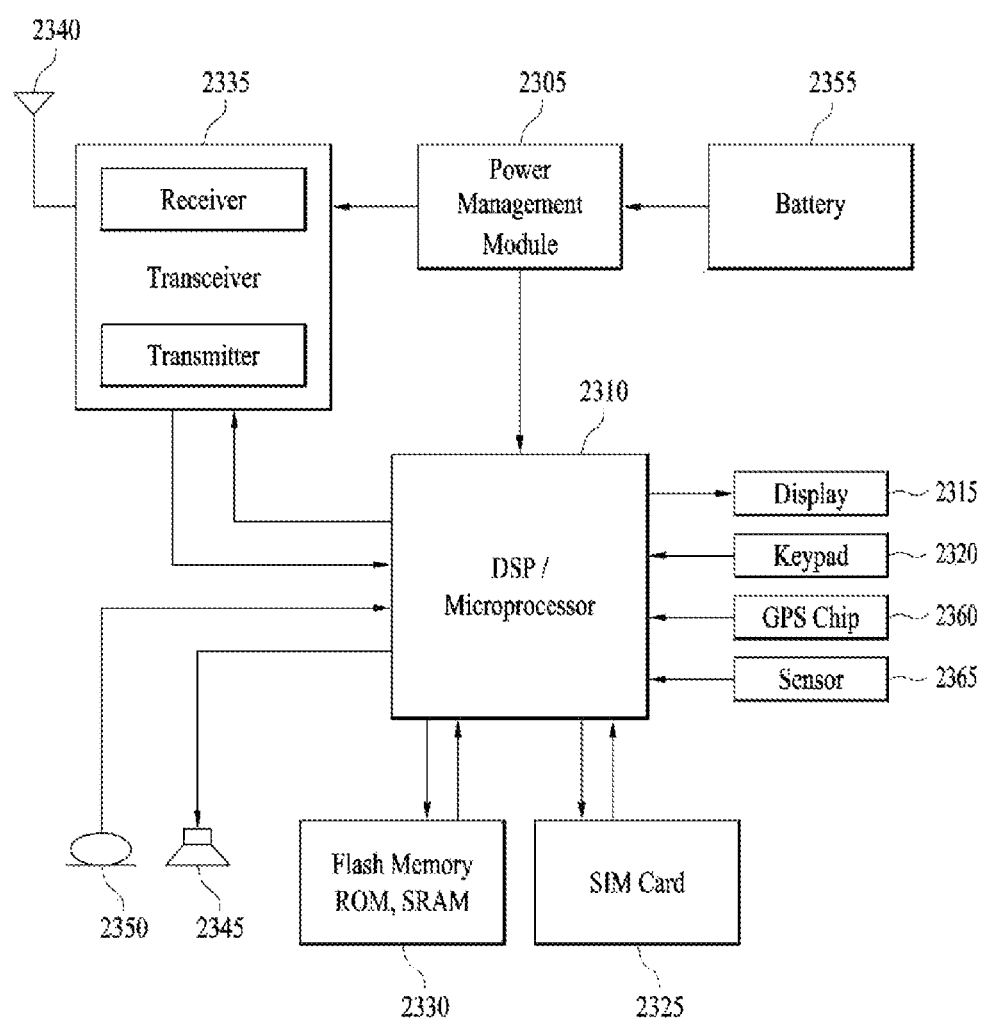
FIG. 20 is a diagram schematically illustrating a wireless communication device according to an embodiment of the present disclosure.

FIG. 20 is a diagram schematically illustrating a wireless communication device according to an embodiment of the present disclosure.

Particularly, FIG. 20 illustrates, as an example, the UE 2220 shown in FIG. 19 in detail. However, the wireless communication device of FIG. 20 is not limited to the UE 2220, and the wireless communication device may be any mobile computing device configured to be suitable for implementing at least one of the above-described embodiments. For example, such a mobile computing device may include a vehicle communication system and/or device, a wearable device, a laptop, a smartphone, etc.

Referring to FIG. 20, the UE 2220 may include at least one of the following components: a processor 2310 including a digital signal processor (DSP) or a microprocessor, a transceiver 2335, a power management module 2305, an antenna 2340, a battery 2355, a display 2315, a keypad 2320, a global positioning system (GPS) chip 2360, a sensor 2365, a memory 2330, a subscriber identification module (SIM) card 2325, a speaker 2345, and a microphone 2350. The UE 2220 may include a single antenna or multiple antennas.

The processor 2310 may be configured to process the details of the embodiments to implement the functions, procedures, or methods described above in the embodiments. In some embodiments, the processor 2310 may implement one or more protocols such as radio interface protocol layers (e.g., functional layers).

The memory 2330 may be connected to the processor 2310 and configured to store information related to operations of the processor 2310. The memory 2330 may be located inside or outside the processor 2310 and connected to the processor 2310 in various ways such as wireless or wired connections.

A user may enter various types of information (e.g., instruction information such as a phone number) in various ways, for example, by pushing the buttons on the keypad 2320 or by voice recognition through the microphone 2350. The processor 2310 may receive and process the information from the user and then perform an appropriate function such as dialing the phone number. In some embodiments, data (e.g., operational data) may be retrieved from the SIM card 2325 or the memory 2330 to perform specific function(s). In some embodiments, the processor 2310 may receive and process GPS information from the GPS chip 2360 and then perform functions related to the position or location of the UE (e.g., vehicle navigation, map services, etc.). In some embodiments, the processor 2310 may display various types of information and data on the display 2315 for the user's reference and convenience.

The transceiver 2335 may be connected to the processor 2310 and configured to transmit and/or receive a radio signal such as a radio frequency (RF) signal. The processor 2310 may control the transceiver 2335 to initiate communication and transmit radio signals including various types of information or data, for example, voice communication data. The transceiver 2335 includes a receiver configured to receive a radio signal and a transmitter configured to transmit a radio signal.

The antenna 2340 is a device for performing radio signal transmission and reception. In some embodiments, upon receiving radio signals, the transceiver 2335 may forward and convert the signals to baseband frequency for processing by the processor 2310. The processed signals may be converted into audible or readable information based on various techniques, and the audible or readable information may be output through the speaker 2345 or the display 2315.

In some embodiments, the sensor 2365 may be connected to the processor 2310. The sensor 2365 may include one or more sensing devices configured to detect various types of information such as a speed, acceleration, light, vibration, proximity, location, image, etc. The processor 2310 may receive and process sensor information obtained from the sensor 2365 and perform various types of functions such as collision avoidance, autonomous driving, etc.

As shown in FIG. 20, the UE may further include various components (e.g., a camera, a universal serial bus (USB)

port, etc.). For example, a camera may be further connected to the processor 2310 and used for various services such as autonomous driving, vehicle safety services, etc. That is, FIG. 20 shows one example of the UE, and thus, the scope of the present disclosure is not limited to the configuration illustrated in FIG. 20. For example, some of the following components: the keypad 2320, the GPS chip 2360, the sensor 2365, the speaker 2345, and the microphone 2350 may not be included or implemented in the UE.

Figure 21:
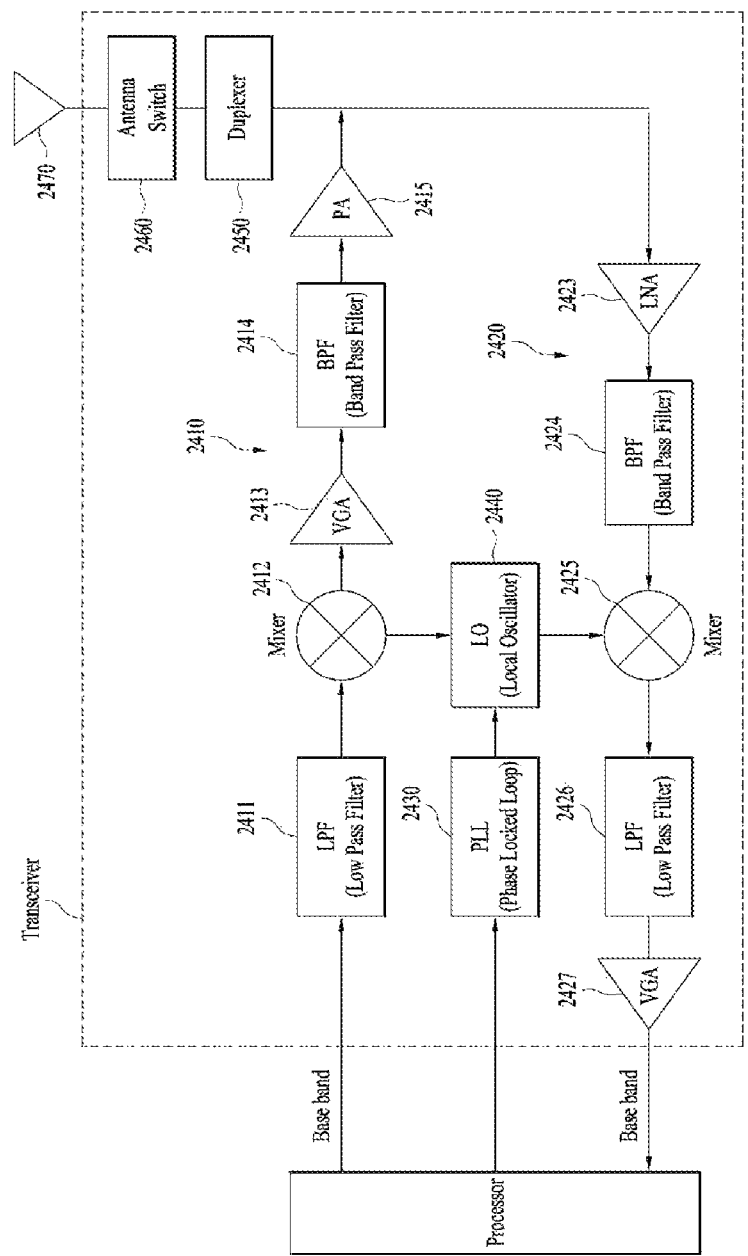
FIG. 21 is a block diagram schematically illustrating a transceiver of a wireless communication device.

FIG. 21 is a block diagram schematically illustrating a transceiver of a wireless communication device according to an embodiment of the present disclosure.

Specifically, FIG. 21 shows an example of a transceiver capable of operating in an FDD system.

Figure 22:
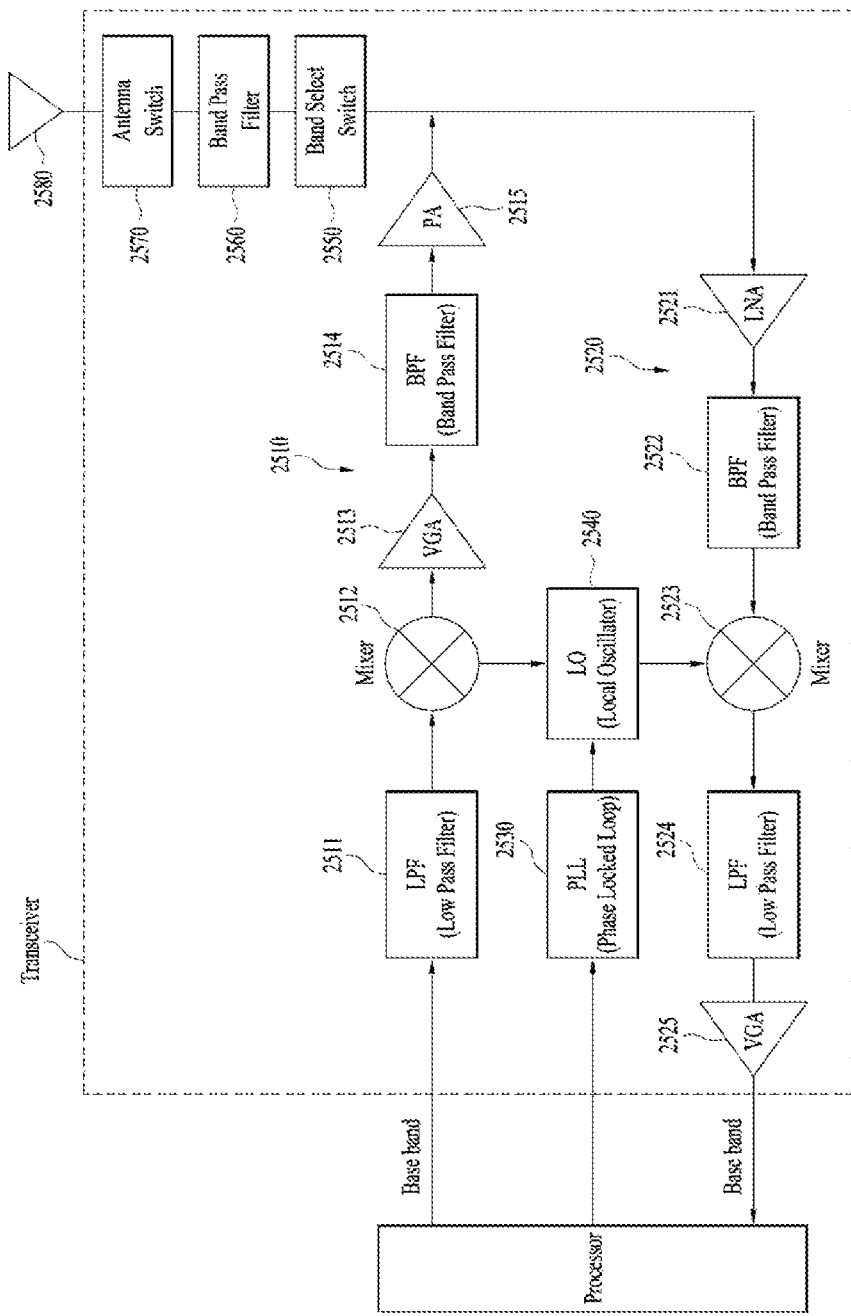
FIG. 22 is a block diagram schematically illustrating another example of a transceiver of a wireless communication device.

In the transmit path, at least one processor including the processors described in FIGS. 21 and 22 may be configured to process data to be transmitted and provide a signal such as an analog output signal to a transmitter 2410.

At the transmitter 2410, the analog output signal may be filtered by a low pass filter (LPF) 2411 (to remove artifacts caused by conventional analog-to-digital conversion (ADC)), up-converted from baseband to RF by an up-converter (e.g., mixer) 2412, and amplified a variable gain amplifier (VGA) 2413. The amplified signal may be filtered by a filter 2414, further amplified by a power amplifier (PA) 2415, routed through a duplexer 2450 and/or an antenna switch 2460, and transmitted on an antenna 2470.

In the receive path, the antenna 2470 may receive a signal from a wireless environment. The receive signal may be routed through the antenna switch 2460 and the duplexer 2450 and then provided to a receiver 2420.

At the receiver 2420, the received signal may be amplified by an amplifier such as a low noise amplifier (LNA) 2423, filtered by a band pass filter 2424, and down-converted from RF to baseband by a downconverter (e.g., mixer) 2425.

The down-converted signal may be filtered by an LPF 2426 and amplified by an amplifier such as a VGA 2427 to obtain an analog input signal. Then, the analog input signal may be provided to the processors in FIGS. 21 and 22.

Further, a local oscillator (LO) generator 2440 may generate and provide transmission and reception LO signals to the up-converter 2412 and the down-converter 2425, respectively.

The present disclosure is not limited to the configuration shown in FIG. 21, and various components and circuits may be arranged differently from the example shown in FIG. 21 to achieve the functions and effects according to the present disclosure.

FIG. 22 illustrates another example of a transceiver of a wireless communication device according to an embodiment of the present disclosure.

Specifically, FIG. 21 shows an example of a transceiver capable of operating in a TDD system.

In some embodiments, a transmitter 2510 and a receiver 2520 included in the transceiver of the TDD system may have one or more features similar to those of the transmitter and the receiver included in the transceiver of the FDD system. Hereinafter, the structure of the transceiver of the TDD system will be described.

In the transmit path, a signal amplified by a power amplifier (PA) 2515 in the transmitter is routed through a band select switch 2550, a BPF 2560, and an antenna switch 2570 and transmitted on an antenna 2580.

In the receive path, the antenna 2580 may receive a signal from a wireless environment. The receive signal may be routed through the antenna switch(es) 2570, BPF 2560, and band select switch 2550 and provided to the receiver 2520.

Figure 23:
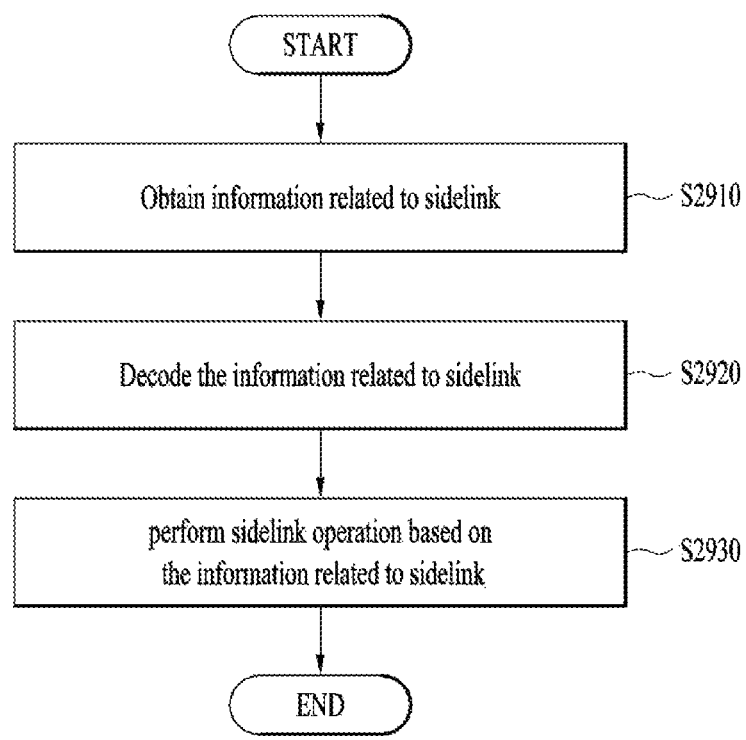
FIG. 23 is a flowchart for explaining sidelink operations of a wireless device.

FIG. 23 is a flowchart for explaining sidelink operations of a wireless device.

Referring to FIG. 23, the wireless device may obtain information related to sidelink (S2910). The information related to the sidelink may include at least one resource configuration. The information related to the sidelink may be obtained from another wireless device or a network node.

After obtaining the information, the wireless device may decode the information related to the sidelink (S2920).

After decoding the information related to the sidelink, the wireless device may perform one or more sidelink operations based on the information related to the sidelink (S2930). Herein, the sidelink operation(s) performed by the wireless device may correspond to the one or more operations described in the flowchart.

The sidelink operations of the wireless device illustrated in FIG. 23 is merely exemplary, and the wireless device may perform sidelink operations based on various techniques. The sidelink may correspond to a UE-to-UE interface for sidelink communication and/or sidelink discovery. The sidelink may correspond to a PC5 interface as well. In a broad sense, sidelink operation may mean information transmission/reception between UEs.

Figure 24:
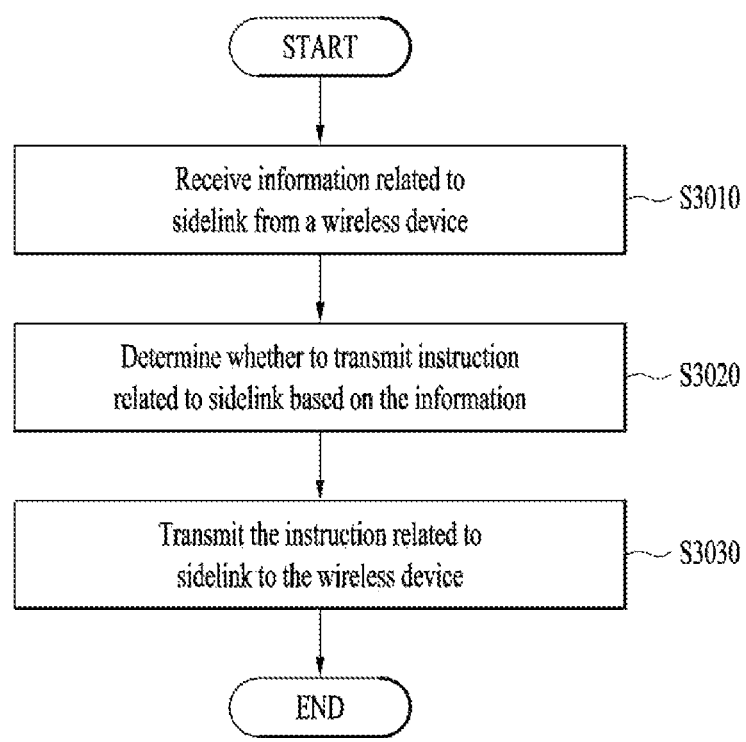
FIG. 24 is a flowchart for explaining sidelink operations of a network node.

FIG. 24 is a flowchart for explaining sidelink operations of a network node.

The sidelink operations of the network node illustrated in FIG. 24 is merely exemplary, and the network node may perform sidelink operations based on various techniques.

The network node may receive information related to sidelink from a wireless device (S3010). For example, the information related to the sidelink may be 'SidelinkUEInformation' which is used to indicate sidelink information to a network node.

After receiving the information, the network node may determine whether to transmit one or more instructions related to the sidelink based on the received information (S3020).

When determining to transmit the instruction(s), the network node may transmit the sidelink-related instruction(s) to the wireless device (S3030). In some embodiments, after receiving the instruction(s) transmitted from the network node, the wireless device may perform one or more sidelink operations based on the received instruction(s).

Figure 25:
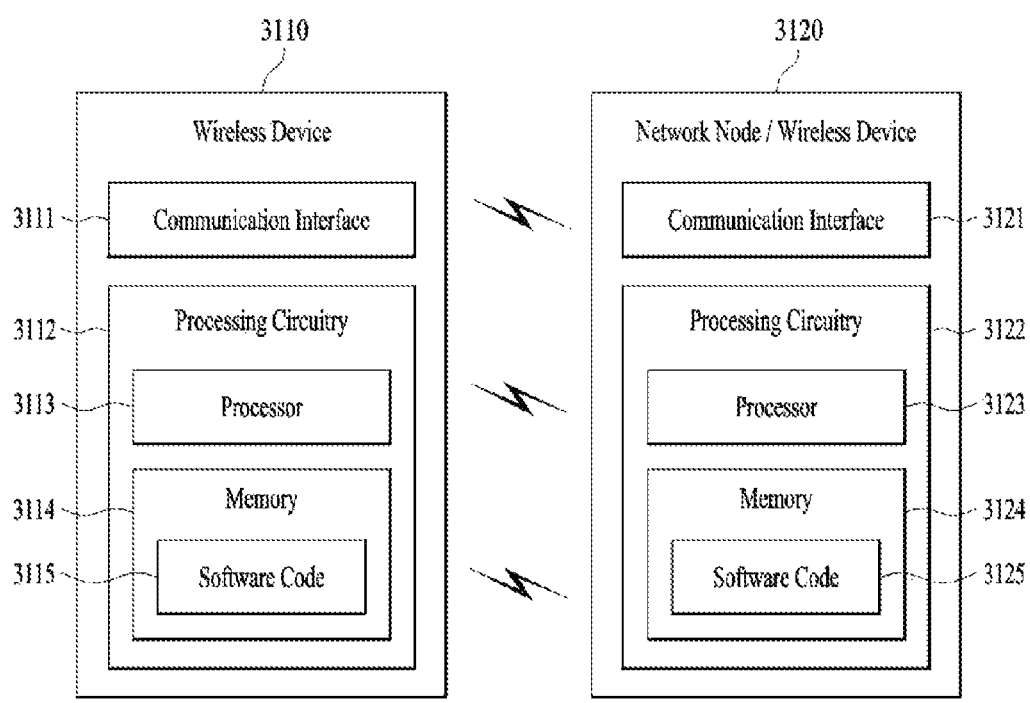
FIG. 25 is a block diagram schematically illustrating the configurations of a wireless device and a network node.

FIG. 25 is a block diagram schematically illustrating the configurations of a wireless device and a network node. A network node 3120 may be replaced with the wireless device or UE shown in FIG. 19.

For example, a wireless device 3110 may include a communication interface 3111 for communicating with one or more other wireless devices, network nodes, and/or other entities in the network. The communication interface 3111 may include one or more transmitters, one or more receivers, and/or one or more communications interfaces. The wireless device 3110 may include a processing circuitry 3112. The processing circuitry 3112 may include at least one processor such as a processor 3113 and at least one memory device such as a memory 3114.

The processing circuitry 3112 may be configured to control at least one of the above-described methods and/or processes and enable the wireless device 3110 to perform the methods and/or processes. The processor 3113 may correspond to one or more processors for performing the wireless device functions described herein. The wireless device 3110 may include a memory 3114 configured to store data, programmable software code, and/or other information described herein.

In some embodiments, the memory 3114 may be configured to store software code 3115 including instructions that allow at least one processor to perform some or all of the processes described above with reference to FIG. 23 or the methods described above in the embodiments.

For example, at least one process for transmitting and receiving information may be performed by the processor 3113 controlling the transceiver 2223 in FIG. 19 to transmit and receive the information.

The network node 3120 may include a communication interface 3121 for communicating with one or more other network nodes, wireless devices, and/or other entities in the network. The communication interface 3121 may include one or more transmitters, one or more receivers, and/or one or more communications interfaces. The network node 3120 may include a processing circuitry 3122. The processing circuitry 3122 may include a processor 3123 and a memory 3124.

For example, at least one process for transmitting and receiving information may be performed by the processor 3123 controlling the transceiver 2213 in FIG. 20 to transmit and receive the information.

The wireless device 3110 or the network node 3120 may be a BS, a network node, a Tx UE, an Rx UE, a wireless device, a wireless communication device, a vehicle, a vehicle having an autonomous traveling function, an unmanned aerial vehicle (UAV), an artificial intelligence (AI) module, a robot, an augmented reality (AR) device, a virtual reality (VR) device, an MTC device, an Internet of things (IoT) device, a medical device, a FinTech device (or a financial device), a security device, a weather/environment device, or a device related to fourth industrial revolution or a 5G service. The UAV may be, for example, an aircraft without a human being onboard, which aviates by a wireless control signal. The MTC device and the IoT device may be, for example, devices that do not require direct human intervention or manipulation and may include smartmeters, vending machines, thermometers, smartbulbs, door locks, or various sensors. The medical device may be, for example, a device used for the purpose of diagnosing, treating, relieving, curing, or preventing disease or a device used for the purpose of inspecting, replacing, or modifying a structure or a function and may include a device for treatment, a device for operation, a device for (in vitro) diagnosis, a hearing aid, or an operation device. The security device may be, for example, a device installed to prevent a danger that may arise and to maintain safety and may include a camera, a CCTV, or a black box. The FinTech device may be, for example, a device capable of providing a financial service such as mobile payment and may include a payment device or a point of sale (POS) system. The weather/environment device may be, for example, a device for monitoring or predicting a weather/environment.

The UE may include, for example, a cellular phone, a smartphone, a laptop computer, a digital broadcast terminal, a personal digital assistant (PDA), a portable multimedia player (PMP), a navigation system, a slate PC, a tablet PC, an ultrabook, a wearable device (e.g., a smartwatch, smartglasses, or a head mounted display (HMD)), or a foldable device. The HMD may be, for example, a type of display device that is worn on the head and may be used to implement VR or AR.

Figure 26:
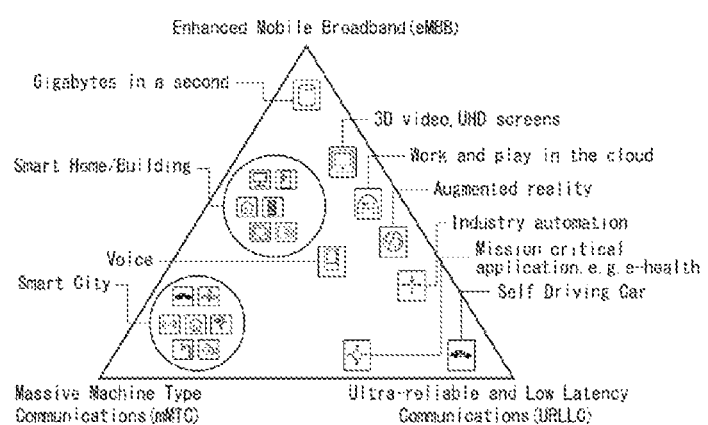
FIG. 26 is a diagram illustrating an example of 5G use scenarios.

Referring to FIG. 26, three main requirement categories for 5G include (1) a category of enhanced mobile broadband (eMBB), (2) a category of massive machine type communication (mMTC), and (3) a category of ultra-reliable and low-latency communications (URLLC).

Partial use cases may require a plurality of categories for optimization and other use cases may focus upon only one key performance indicator (KPI). 5G supports such various use cases using a flexible and reliable method.

eMBB far surpasses basic mobile Internet access and covers abundant bidirectional work and media and entertainment applications in cloud and augmented reality. Data is one of a core driving force of 5G and, in the 5G era, a dedicated voice service may not be provided for the first time. In 5G, it is expected that voice will simply be processed as an application program using data connection provided by a communication system. Main causes for increased traffic volume are increase in the size of content and an increase in the number of applications requiring high data transmission rate. A streaming service (of audio and video), conversational video, and mobile Internet access will be more widely used as more devices are connected to the Internet. These application programs require always-on connectivity in order to push real-time information and alerts to users. Cloud storage and applications are rapidly increasing in a mobile communication platform and may be applied to both work and entertainment. Cloud storage is a special use case which accelerates growth of uplink data transmission rate. 5G is also used for cloud-based remote work. When a tactile interface is used, 5G demands much lower end-to-end latency to maintain good user experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential IoT devices will reach 20.4 billion up to the year of 2020. Industrial IoT is one of categories of performing a main role enabling a smart city, asset tracking, smart utilities, agriculture, and security infrastructure through 5G.

URLLC includes new services that will transform industries with ultra-reliable/available, low-latency links such as remote control of critical infrastructure and a self-driving vehicle. A level of reliability and latency is essential to control and adjust a smart grid, industrial automation, robotics, and a drone.

Next, a plurality of use cases in a triangle of FIG. 26 will be described in more detail.

5G is a means of providing streaming at a few hundred megabits per second to gigabits per second and may complement fiber-to-the-home (FTTH) and cable-based broadband (or DOCSIS). Such high speed is needed to deliver TV at a resolution of 4K or more (6K, 8K, and more), as well as virtual reality and augmented reality. Virtual reality (VR) and augmented reality (AR) applications include immersive sports games. A specific application program may require a special network configuration. For example, for VR games, gaming companies need to incorporate a core server into an edge network server of a network operator in order to minimize latency.

Automotive is expected to be a new important driving force in 5G together with many use cases for mobile communication for vehicles. For example, entertainment for passengers requires high simultaneous capacity and mobile broadband with high mobility. This is because future users continue to expect high connection quality regardless of location and speed. Another automotive use case is an AR dashboard. The AR dashboard displays information talking to a driver about a distance to an object and movement of the object by being superimposed on an object seen from a front window to identify an object in the dark. In the future, a wireless module will enable communication between vehicles, information exchange between a vehicle and supporting infrastructure, and information exchange between a vehicle and other connected devices (e.g., devices transported by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by a human being.

A smart city and a smart home mentioned as a smart society will be embedded in a high-density wireless sensor network. A distributed network of an intelligent sensor will identify conditions for costs and energy-efficient maintenance of a city or a home. Similar configurations may be performed for respective households. All temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is highly decentralized so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of energy such as electricity by a method having efficiency, reliability, economic feasibility, sustainability of production, and automatability. The smart grid may also be regarded as another sensor network having low latency.

A health care part contains many application programs capable of enjoying the benefits of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in an industrial application field. Wiring is high in installation and maintenance cost. Therefore, a possibility of replacing a cable with reconstructible wireless links is an attractive opportunity in many industrial fields. However, in order to achieve this replacement, it is necessary for wireless connection to be established with latency, reliability, and capacity similar to those of cables and management of wireless connection needs to be simplified. Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

The above-described embodiments of the present disclosure may be implemented through various means, for example, hardware, firmware, software, or a combination thereof.

In a hardware configuration, the methods according to the embodiments of the present disclosure may be achieved by at least one of application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, the methods according to the embodiments of the present disclosure may be implemented in the form of a module, a procedure, a function, etc. for performing the above-described functions or operations. Software code may be stored in a memory unit and executed by a processor. The memory unit may be located inside or outside the processor and exchange data with the processor via various known means.

The detailed descriptions of the preferred embodiments of the present disclosure are provided to allow those skilled in the art to implement and embody the present disclosure. While the present disclosure has been described and illustrated herein with reference to the preferred embodiments thereof, it will be apparent to those skilled in the art that various modifications and variations may be made therein without departing from the spirit and scope of the disclosure. Therefore, the present disclosure is not limited to the embodiments disclosed herein but intends to give the broadest scope consistent with the new principles and features disclosed herein.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The above-described embodiments of the present disclosure are applicable to various mobile communication systems.

The invention claimed is:

1. A method of reporting logged information by a user equipment (UE) in a wireless communication system supporting sidelink, the method comprising:
receiving logging configuration information related to logging measurement information for a radio link,
wherein the logging configuration information includes a tracking area and a logging duration;

logging the measurement information measured for a sidelink that is the radio link based on the logging configuration information; and reporting the logged information to a base station (BS) based on the logging configuration information, wherein the measurement information includes a reference signal received power (RSRP) and a reference signal received quality (RSRQ), and wherein the logged information includes the RSRP and the RSRQ independently measured and logged for each Proximity Service Per-Packet Priority (PPPP), and reporting the logged information further based on a transmission delay higher than a threshold configured for the each PPPP.

2. The method of claim 1, wherein the measurement information is separately measured according to a preset resource pool, a distance from another UE, a traveling direction of the UE, or a geographical position of the UE.

3. The method of claim 1, wherein the UE further reports the logged information to the BS, based on at least one of a block error ratio (BLER), a packet reception ratio (PRR), the reference signal received power (RSRP), the reference signal received quality (RSRQ), a received signal strength indicator (RSSI), or a channel busy ratio (CBR), which is less than a preset threshold value.

4. The method of claim 1, wherein the logged information further includes at least one of the size of a packet related to the sidelink signal, information about a generation interval of the packet, information about an average time staying in a queue before transmission of the packet, or information about a dropped ratio of the packet.

5. The method of claim 1, wherein the logged information further includes at least one of information about a modulation and coding scheme (MCS) related to the sidelink signal, information about carrier aggregation (CA) capability, or information about a multiple-input multiple-output (MIMO) scheme.

6. The method of claim 1, wherein the logged information further includes information about how many times resource reselection for the sidelink signal is triggered or how frequently resource reselection for the sidelink signal is triggered.

7. The method of claim 1, wherein the logged information further includes at least one of information about quality of a reference synchronization signal, information about quality related to positioning, information about a recognition rate of a sensor included in the UE, or information about mobility of the UE.

8. The method of claim 1, wherein the logged information further includes at least one of a channel utilization ratio (CR) or a channel busy ratio (CBR).

9. The method of claim 1, wherein the logged information further includes at least one of a block error rate (BLER), a packet reception ratio (PRR), or packet inter-reception time (PIR), measured for a received sidelink signal.

10. The method of claim 9, wherein the PIR is a measurement value for a time difference between received sidelink signals having an equal source identifier (ID).

11. An apparatus for transmitting logged information in a wireless communication system supporting sidelink, the apparatus comprising:

a processor; and a memory operationally coupled to the processor, wherein the processor is configured to receive logging configuration information related to logging measurement information for a radio link, log the measurement information measured for a sidelink that is the radio link based on the logging configuration information, and report the logged information to a base station (BS) based on the logging configuration information, wherein the logging configuration information includes a tracking area and a logging duration, wherein the measurement information includes a reference signal received power (RSRP) and a reference signal received quality (RSRQ), wherein the logged information includes the RSRP and the RSRQ independently measured and logged for each Proximity Service Per-Packet Priority (PPPP), and wherein the logged information is further reported based on a transmission delay higher than a threshold configured for the each PPPP.

* * * * *